(12) United States Patent
Shen et al.

(10) Patent No.: US 8,473,422 B2
(45) Date of Patent: Jun. 25, 2013

(54) METHOD AND SYSTEM FOR SOCIAL NETWORK ANALYSIS

(75) Inventors: Zeqian Shen, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 287 days.

(21) Appl. No.: 12/957,327

(22) Filed: Nov. 30, 2010

(65) Prior Publication Data

US 2011/0071953 A1    Mar. 24, 2011

Related U.S. Application Data

(63) Continuation of application No. 11/967,222, filed on Dec. 30, 2007.

(60) Provisional application No. 60/984,677, filed on Nov. 1, 2007, provisional application No. 60/971,904, filed on Sep. 12, 2007.

(51) Int. Cl.
*G06Q 99/00* (2006.01)
*G06Q 30/00* (2006.01)
*G06F 15/173* (2006.01)

(52) U.S. Cl.
USPC ............... 705/319; 709/224; 705/26.1

(58) Field of Classification Search
USPC ................... 705/319, 26.1; 709/224
See application file for complete search history.

(56) References Cited

U.S. PATENT DOCUMENTS

| | | |
|---|---|---|
| 6,285,999 B1 | 9/2001 | Page |
| 6,895,385 B1 | 5/2005 | Zacharia et al. |
| 7,089,252 B2 | 8/2006 | Tomlin et al. |
| 7,177,880 B2 | 2/2007 | Ruvolo et al. |
| 7,464,076 B2 * | 12/2008 | Eiron et al. ............... 1/1 |
| 7,526,459 B2 | 4/2009 | Flinn et al. |
| 7,640,488 B2 | 12/2009 | Bar-yoseef et al. |
| 2003/0050909 A1 * | 3/2003 | Preda et al. ............... 707/1 |
| 2003/0204502 A1 | 10/2003 | Tomlin et al. |

(Continued)

FOREIGN PATENT DOCUMENTS

WO    WO-2009035683 A1    3/2009

OTHER PUBLICATIONS

Boginski, Vladimir L., Optimization and information retrieval techniques for complex networks. University of Florida, 2005.*

(Continued)

*Primary Examiner* — Jonathan Ouellette
*Assistant Examiner* — Amanda Kirlin
(74) *Attorney, Agent, or Firm* — Schwegman Lundberg & Woessner, P.A.

(57) ABSTRACT

Methods and system for social commerce network analysis are described. In one embodiment, a strongly connected component value, an in-component value, an out-component value, a disconnected component value, a tendril value, and a tube value of a social network for a time period may be accessed. A social strength of the social network for the time period may be calculated by combining the strongly connected component value, the in-component value, the out-component value, the disconnected component value, the tendril value, and the tube value. The social strength of the social network for the time period may be utilized for analysis of the social network. The strongly connected component value may have a greatest weight and the disconnected component value may have the lowest weight in the combining.

18 Claims, 21 Drawing Sheets

U.S. PATENT DOCUMENTS

| | | | |
|---|---|---|---|
| 2004/0122803 | A1 | 6/2004 | Dom et al. |
| 2005/0080655 | A1 | 4/2005 | Sengir et al. |
| 2006/0095430 | A1 | 5/2006 | Zeng et al. |
| 2006/0122998 | A1 | 6/2006 | Bar-yossef et al. |
| 2006/0136098 | A1 | 6/2006 | Chitrapura et al. |
| 2006/0218153 | A1 | 9/2006 | Voon et al. |
| 2006/0287842 | A1 | 12/2006 | Kim |
| 2007/0124291 | A1 | 5/2007 | Hassan et al. |
| 2007/0168533 | A1 | 7/2007 | Canright et al. |
| 2007/0179834 | A1 | 8/2007 | Carter et al. |
| 2007/0226248 | A1 | 9/2007 | Darr |
| 2008/0189380 | A1 | 8/2008 | Bosworth et al. |
| 2008/0228740 | A1 | 9/2008 | Weiss et al. |
| 2008/0229244 | A1 | 9/2008 | Markus et al. |
| 2009/0037211 | A1 | 2/2009 | Mcgill et al. |
| 2009/0070130 | A1 | 3/2009 | Sundaresan et al. |
| 2009/0070460 | A1 | 3/2009 | Shen et al. |
| 2009/0070679 | A1 | 3/2009 | Shen et al. |
| 2011/0161191 | A1 | 6/2011 | Shen et al. |

OTHER PUBLICATIONS

"U.S. Appl. No. 11/967,221, Non Final Office Action mailed Dec. 10, 2010", 24 pgs.

"U.S. Appl. No. 11/967,222 Final Office Action mailed Aug. 31, 2010", 10 pgs.

"U.S. Appl. No. 11/967,222, Non-Final Office Action mailed Jan. 29, 2010", 22 pgs.

"U.S. Appl. No. 11/967,222, Response filed Jun. 29, 2010 to Non Final Office Action mailed Jan. 29, 2010", 19 pgs.

"International Application Serial No. PCT/US2008/10694, International Search Report Mailed on Nov. 21, 2008", 4 pgs.

"International Application Serial No. PCT/US2008/10694, International Written Opinion Mailed on Nov. 21, 2008", 7 pgs.

"Koalapiyo", [Online]. Retrieved from the Internet: <URL: http://209.85.165.104/search?q=cache:m0kULUUJTGkJ:www.xanga.com/koalapiyo/607065466/friendship-wheel.html+%22facebook%22+*+%22friendship+wheel%22&hl=en&ct=clnk&cd=4&gl=us&client=firefox-a>, (Jul. 30, 2007), 1 pgs.

Adamic, Lada, "Introductory social network analysis with Pajek", (2008), 29 pgs.

Artzy-Randrup, Y., et al., "Comment on "Network motifs: simple building blocks of complex networks" and "Superfamilies of evolved and designed networks".", Science, 305(5687), (Aug. 20, 2004), 1107.

Becchetti, Luca, et al., "A Comparison of Sampling Techniques for Web Graph Characterization", (Aug. 20, 2006), 8 pgs.

Broder, Andrei, et al., "Graph structure in the Web", http://www9.org/w9cdroml160/160.html, (Nov. 28, 2003), 16 pgs.

Donato, Debora, et al., "Mining the inner structure of the Web graph", 8th International Workshop on the Web and Databases, (Jun. 2005), 6 pgs.

Kashtan, N., et al., "Efficient sampling algorithm for estimating subgraph concentrations and detecting network motifs.", Bioinformatics, 20(11), (Jul. 22, 2004), 1746-58.

Kleinberg, Joe, "Authoritative sources in a hyperlinked environment.", Proc. Ninth Ann. ACM-SIAM Symp. Discrete Algorithms, (1998), 668-677.

Kumar, Ravi, et al., "The Web and Social Networks", Computer, (Nov. 2002), 32-36.

Milo, R., et al., "Network motifs: simple building blocks of complex networks.", Science, 298(5594), (Oct. 25, 2002), 824-7.

Milo, R., et al., "Response to Comment on "Network Motifs: Simple Building Blocks of Complex Networks" and "Superfamilies of Evolved and Designed Networks"", Science, 305(5687), (Aug. 20, 2004), 1107.

Page, L., et al., "The PageRank Citation Ranking: Bringing Order to the Web", Stanford Digital Library Technologies Project, (1998), 1-17.

Sherman, Chris, "New Web Map Reveals Previously Unseen 'Bow Tie' Organization Structure", Organizational Structure, (May 22, 2000).

Tawde, Vivek, et al., "Generating Web Graphs with Embedded Communities", (2004), 12 pgs.

Vazquez, A, et al., "The topological relationship between the large-scale attributes and local interaction patterns of complex networks.", Proc Natl Acad Sci U S A., 101(52), (Dec. 28, 2004), 17940-5.

Wernicke, S., "Efficient detection of network motifs", IEEE/ACM Trans Comput Biol Bioinform., 3(4), (Oct.-Dec. 2006), 347-59.

Zhang, J., et al., "Expertise Networks in Online Communities: Structure and Algorithms", 16th International World Wide Web Conference (WWW2007), (2007), 1-10.

"U.S. Appl. No. 12/107,250, Response filed Aug. 3, 2011 to Final Office Action mailed Jun. 23, 2011", 17 pgs.

"U.S. Appl. No. 12/107,250, Final Office Action mailed Jun. 23, 2011", 17 pgs.

"U.S. Appl. No. 12/107,250, Non Final Office Action mailed Dec. 27, 2010", 21 pgs.

"U.S. Appl. No. 12/107,250, Response filed Mar. 28, 2011 to Non-Final Office Action mailed Dec. 27, 2010", 13 pgs.

"U.S. Appl. No. 12/958,785, Preliminary Amendment filed Mar. 16, 2011", 3 pgs.

"International Application Serial No. PCT/US2008/10694, International Preliminary Report on Patentability mailed Mar. 25, 2010", 9 pgs.

\* cited by examiner

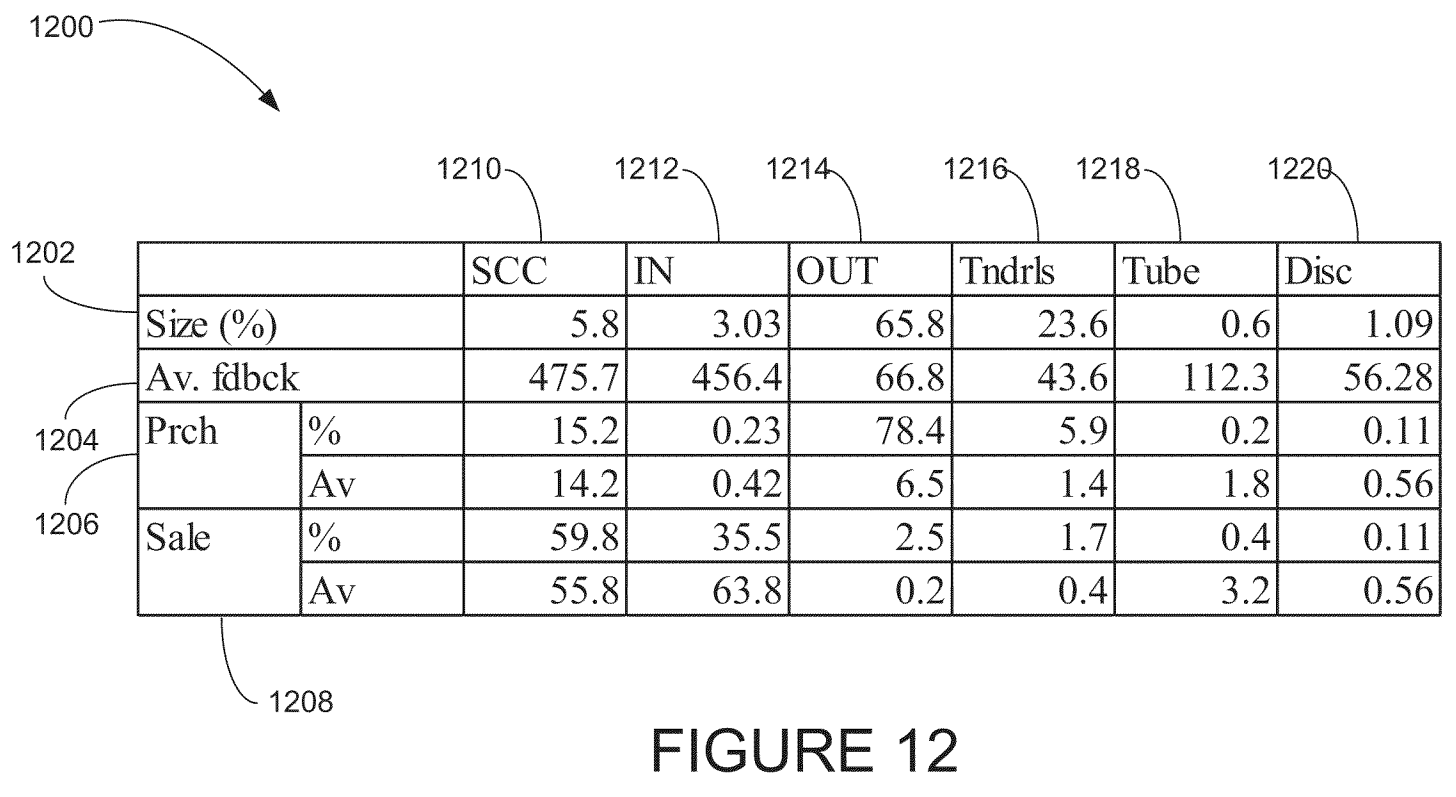

| Size (%) | | SCC | IN | OUT | Tndrls | Tube | Disc |
|---|---|---|---|---|---|---|---|
| Av. fdbck | | 5.8 | 3.03 | 65.8 | 23.6 | 0.6 | 1.09 |
| | | 475.7 | 456.4 | 66.8 | 43.6 | 112.3 | 56.28 |
| Prch | % | 15.2 | 0.23 | 78.4 | 5.9 | 0.2 | 0.11 |
| | Av | 14.2 | 0.42 | 6.5 | 1.4 | 1.8 | 0.56 |
| Sale | % | 59.8 | 35.5 | 2.5 | 1.7 | 0.4 | 0.11 |
| | Av | 55.8 | 63.8 | 0.2 | 0.4 | 3.2 | 0.56 |

FIGURE 12

METHOD AND SYSTEM FOR SOCIAL NETWORK ANALYSIS

This application is a continuation application and claims priority benefit of U.S. patent application Ser. No. 11/967,222 filed Dec. 30, 2007 and entitled "Method and System for Social Network Analysis" which, in turn, claims the benefit of both U.S. Provisional Patent Application Ser. No. 60/971,904, entitled "Social Network Analysis," filed Sep. 12, 2007 and U.S. Provisional Patent Application Ser. No. 60/984,677, entitled "Analysis of a Social Commerce Network," filed Nov. 1, 2007; the entire contents of which are herein incorporated by reference.

TECHNICAL FIELD

The present application relates generally to the technical field of data analysis and management and, in one specific example, to social commerce network analysis.

BACKGROUND

The Internet and World Wide Web include content spaces, commerce spaces, and spaces for social interactions. Within the spaces for social interactions, users may interact with one another in both commercial settings and non-commercial settings.

BRIEF DESCRIPTION OF THE DRAWINGS

Some embodiments are illustrated by way of example and not limitation in the figures of the accompanying drawings in which:

FIG. 12 is an example table that may be generated using the method of FIG. 6, according to an example embodiment.

DETAILED DESCRIPTION

Figure 1:
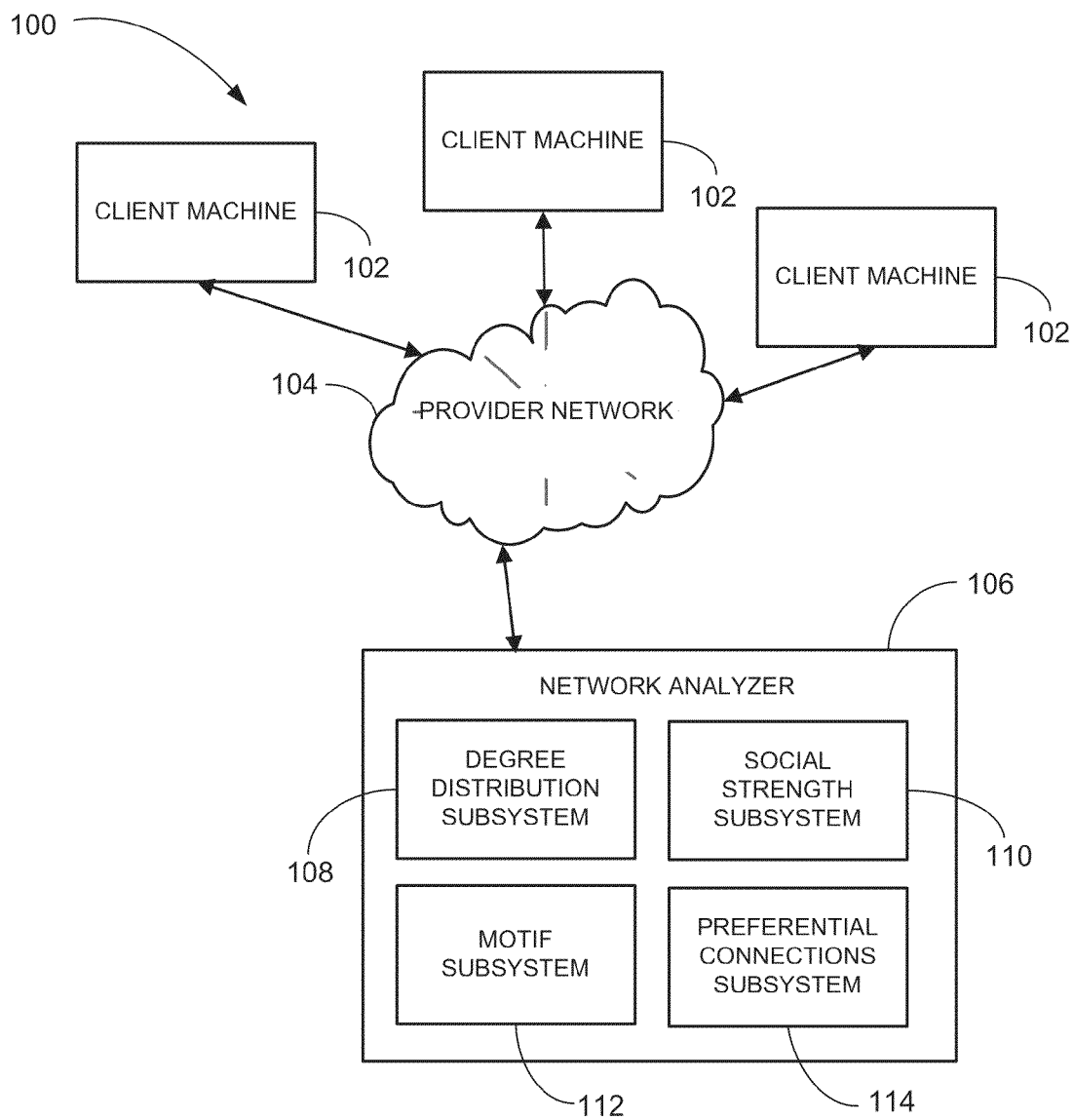
FIG. 1 is a block diagram of an environment in which various embodiments described herein may be practiced.

Example methods and systems to analyze social commerce networks are described. In the following description, for purposes of explanation, numerous specific details are set forth in order to provide a thorough understanding of example embodiments. It will be evident, however, to one skilled in the art that the inventive subject matter may be practiced without these specific details.

Social scientists have extensively studied offline social commerce networks and have developed measures for connectivity, trust, and evolution. As the web evolves from being a content and commerce space to a space of social interactions, study of the nature of these social interactions has become a key area for Internet researchers. Gaining a deeper understanding of online social networks in terms of what structure they have, what kind of interactions they afford, what trust and reputation measures exist, and how they evolve may allow one to build effective user applications and business models around these networks. When social networks have commerce in them even the simplest events like search or mouse clicks can have tangible revenue measures associated therewith.

Some embodiments described herein may be used to study social networks driven by commerce, such as EBay®. As a large online auction site, EBay® has been studied in various areas, including auction models, bidding and selling strategies and reputations models. However, there is no previous study on its social commerce network. The social commerce network is a social network with entities connecting by, for example, trading relations between them.

In addition, it may be desirable to model and analyze a social commerce network as a complex network, because of its large-scale and complex topological features. Complex networks analysis methods focus on large-scale statistical properties of networks. Bow-tie structural analysis provides a way to model the macroscopic structure of networks.

For characterization of microscopic structure within the social commerce networks, significant recurring patterns, referred to as network motifs, may be determined. Motif profiling has been conducted on various networks including genetic networks, neuronal wiring, World Wide Web, social commerce networks, and word-adjacency networks. The networks are clustered into several super-families based their motif significance profiles.

In the examples used to illustrate some embodiments, a dataset of about 78 million transactions of the EBay® Marketplace involving about 14.5 million users was used. The trading network derived from the dataset is a directed graph. Each node denotes a user. An edge from node A to node B exists, if A sold something to B at least once. The number of transactions between the same seller and buyer is stored as an edge weight. A vertex in the network can be a seller in some transactions and a buyer in others. There might be bidirectional edges between two vertices.

The dataset also captured the listing titles, listing categories, and user feedback scores of each transaction. Using the category information, sub-networks for individual categories may be derived. The data used spans over 32 top-level categories. The categories are categories of products listed for sale such as Autos, Baby, Collectibles, Jewelry and Watches, Computers and Networking, Crafts, Antiques, etc.

Architecture

FIG. 1 illustrates an example system 100 in which a community of users may use a number of client machines 102 to be involved in a social network. The client machine 102 may be a computing system, a mobile phone, a personal digital assistant (PDA), a gaming unit, a portable computing unit, and the like. The social network may be a social commerce network over which the users operating the machines may be involved in commercial exchange (e.g., buying or selling). However, other types of social networks (e.g., informational social networks) may also be used.

In an example embodiment, the social commerce network may be a social structure made of nodes (e.g., users, such as individuals or organizations) that are tied by one or more specific types of interdependency including, by way of example, values, visions, ideas, commerce, friends, kinship, dislike, conflict, web links, sexual relations, disease transmission, or airline routes. For example, a social commerce network may be a network that includes a commercial interdependency.

The client machines 102 may participate in the social commerce network by communicating over a provider network 104 with a network analyzer 106. The provider network 104 may be a Global System for Mobile Communications (GSM) network, an Internet Protocol (IP) network, a Wireless Application Protocol (WAP) network, a WiFi network, or an IEEE 802.11 standards network as well as various combinations thereof. Other conventional and/or later developed wired and wireless networks may also be used.

The network analyzer 106 allows the social commerce network to be provided to the users of the client machines 102. The network analyzer 106 may be used to analyze the social commerce network by using a degree distribution subsystem 108, a social strength subsystem 110, a motif subsystem 112, and a preferential connections subsystem 114. The degree distribution subsystem 108 is to analyze a social commerce network using degree distribution, a measure for complex networks. The social strength subsystem 110 is to determine a social strength of the social commerce network by calculating the various levels of contribution of the members of the social commerce network. The motif subsystem 112 is used to analyze recurring, small, connected sub-networks within the social commerce network. The preferential connections subsystem 114 is used to quantify users' tendencies to interact (e.g., participation in a transaction) with other users based on their feedback scores.

A social commerce network may be directed, meaning that edges point in one direction from one node to another node (e.g., from a seller to a buyer). In a directed network, the nodes may each have two different degrees, the in-degree, which is the number of incoming edges (e.g., where the user is a buyer); and the out-degree, which is the number of outgoing edges (e.g., where the user is a seller).

Figure 2:
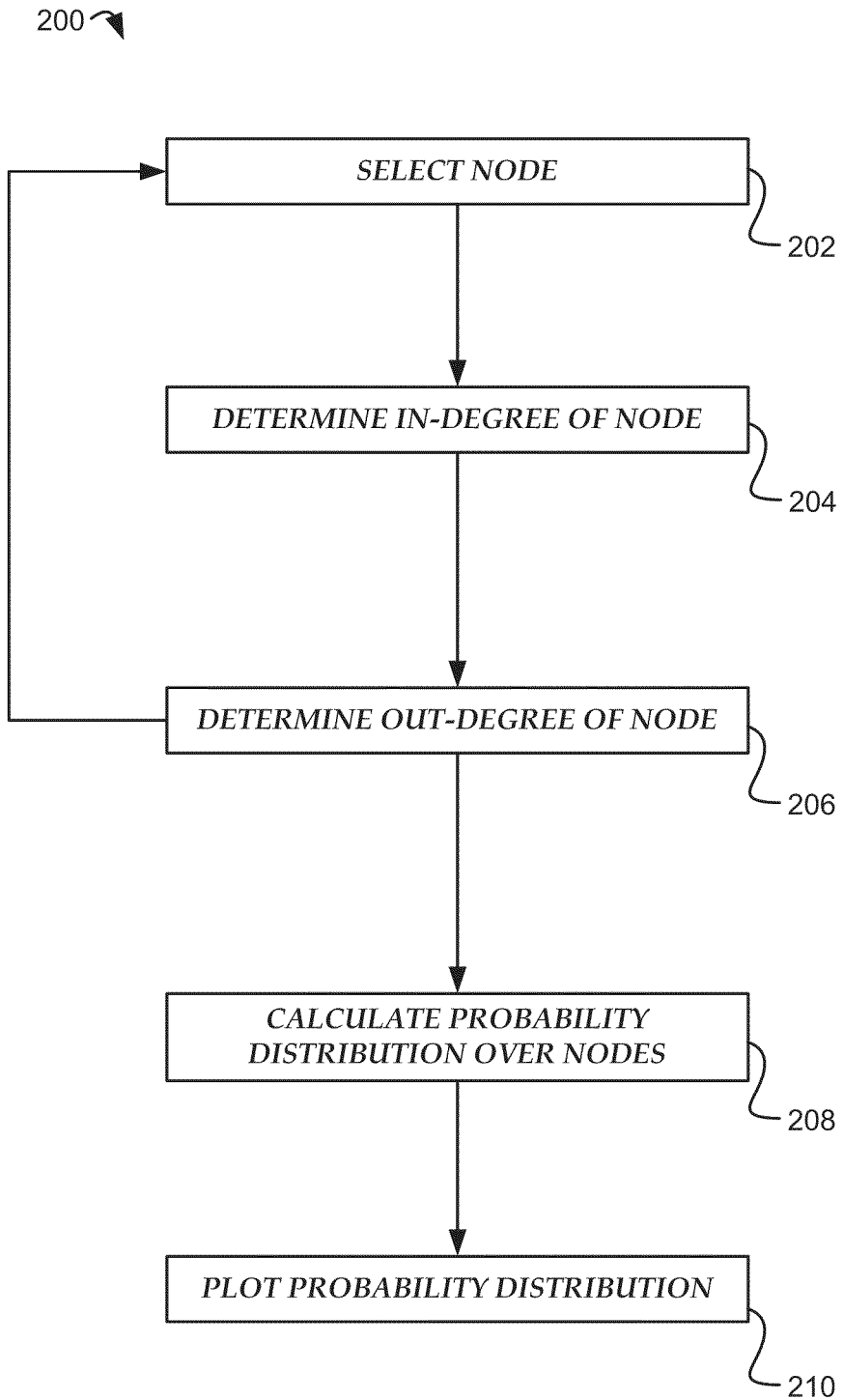
FIG. 2 is a flowchart depicting a method for plotting a degree distribution, according to some embodiments.

FIG. 2 is a flowchart of a degree distribution method 200 to determine the degree distribution of the social commerce network. The degree distribution method 200 may be performed by the social strength subsystem 110 (FIG. 1). The degree of a node (the node representing, e.g., a user) in the social commerce network is the number of connections it has to other nodes. The degree distribution is a probability distribution of these degrees over all of the nodes within a network. Many complex networks exhibit a scale-free nature characterized by the power law distribution of node degrees, $P(k) \sim k^{-r}$, where $P(k)$ is the fraction of vertices (e.g., nodes) in the network that have degree k.

In an operation 202, a particular node is selected. The particular node may be identified randomly or according to a sorting method. In some instances, the nodes may be identified by a number assigned to the node. The node may represent a member of the community, such as a member, a user, a buyer, a seller, etc.

In an operation 204, the in-degree of the node is determined and, in an operation 206, the out-degree of the node is determined. The in-degree or the out-degree may represent the number of transactions engaged in by the user represented by the node. Specifically, the in-degree may be a count of transactions where the user is a buyer and the out-degree may be a count of transactions where the user is a seller. Each of operations 202, 204, and 206 is repeated for each node in the network. In an operation 208, the probability distribution is calculated over the nodes. In an operation 210, the probability distribution is plotted, as shown in FIG. 3.

Figure 3:
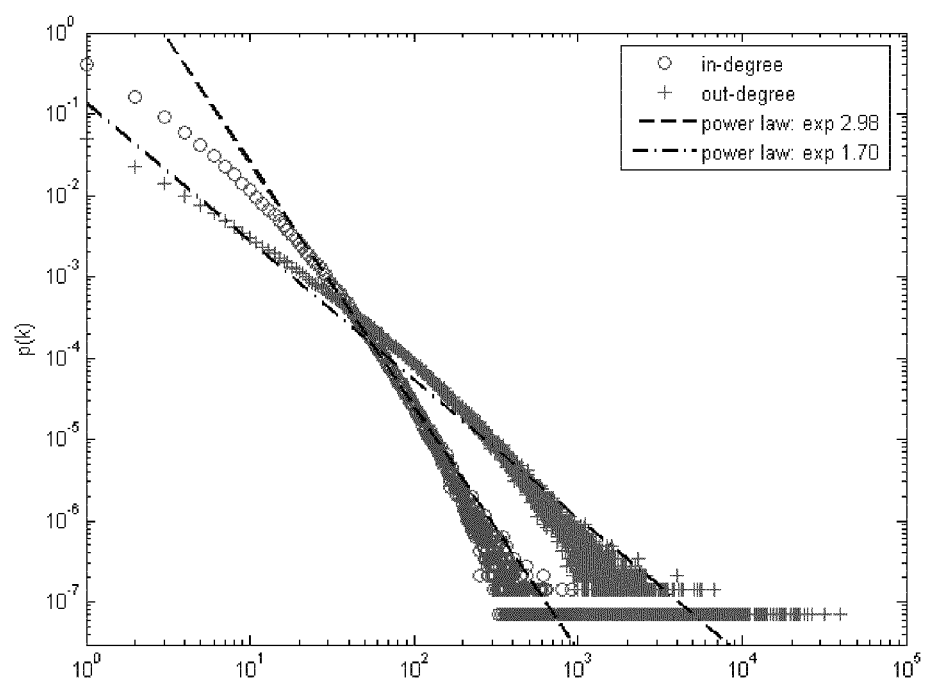
FIG. 3 is an example plot of a degree distribution, according to some embodiments.

The social commerce network is scale-free, as depicted by the plot 300 in FIG. 3. In the case of out-degree, the calculated value of the exponent of the power law is around 1.7 based on the exemplary data plotted. The exponent for in-degree distribution is around 2.98. The results are similar to the distribution observed for other complex networks like the Web. The number of users with small out-degree is far fewer than the number of those with the same value of in-degree. As the value increases, the number of users with certain out-degree exceeds those with the same in-degree. The critical point for this network is about 130. Put another way, sellers in this network tend to be more experienced than buyers.

Figure 4:
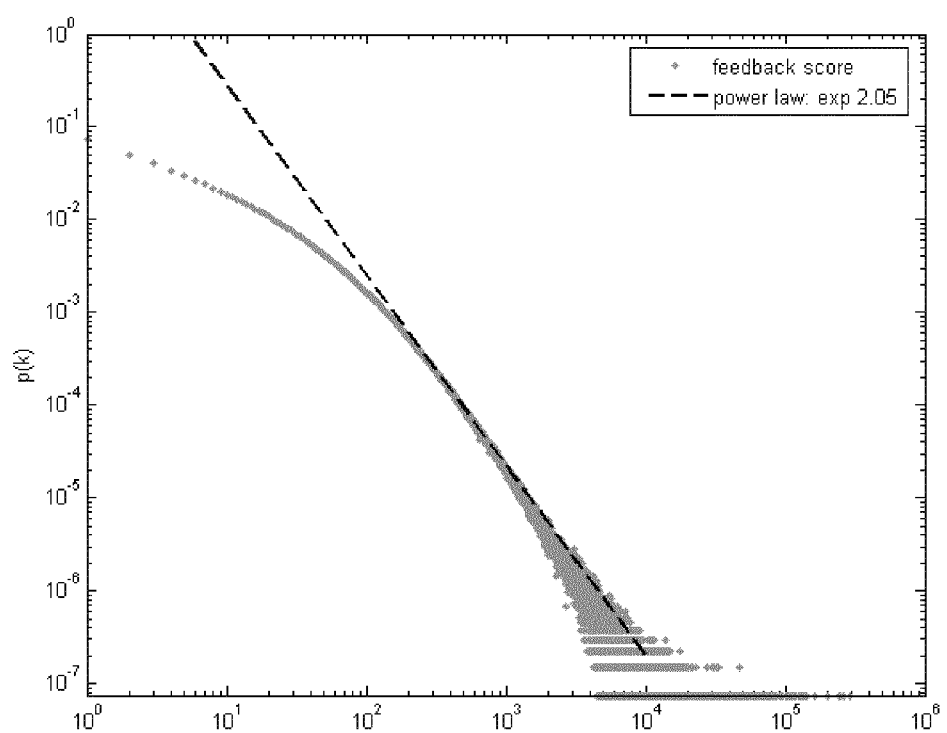
FIG. 4 is a second example of a plot of a feedback distribution, according to some embodiments.

The degree distribution method 200 may be used to analyze other aspects of the social commerce network, as depicted by FIG. 4. FIG. 4 depicts a feedback score distribution 400. In order to plot the log-scaled figure, users with negative feedbacks are dropped. The X axis shows the scores and the Y axis shows the count of users corresponding to these feedback scores. The feedback score distribution 400 also exhibits the power law phenomenon at the exponent of around 2.05.

Figure 5:
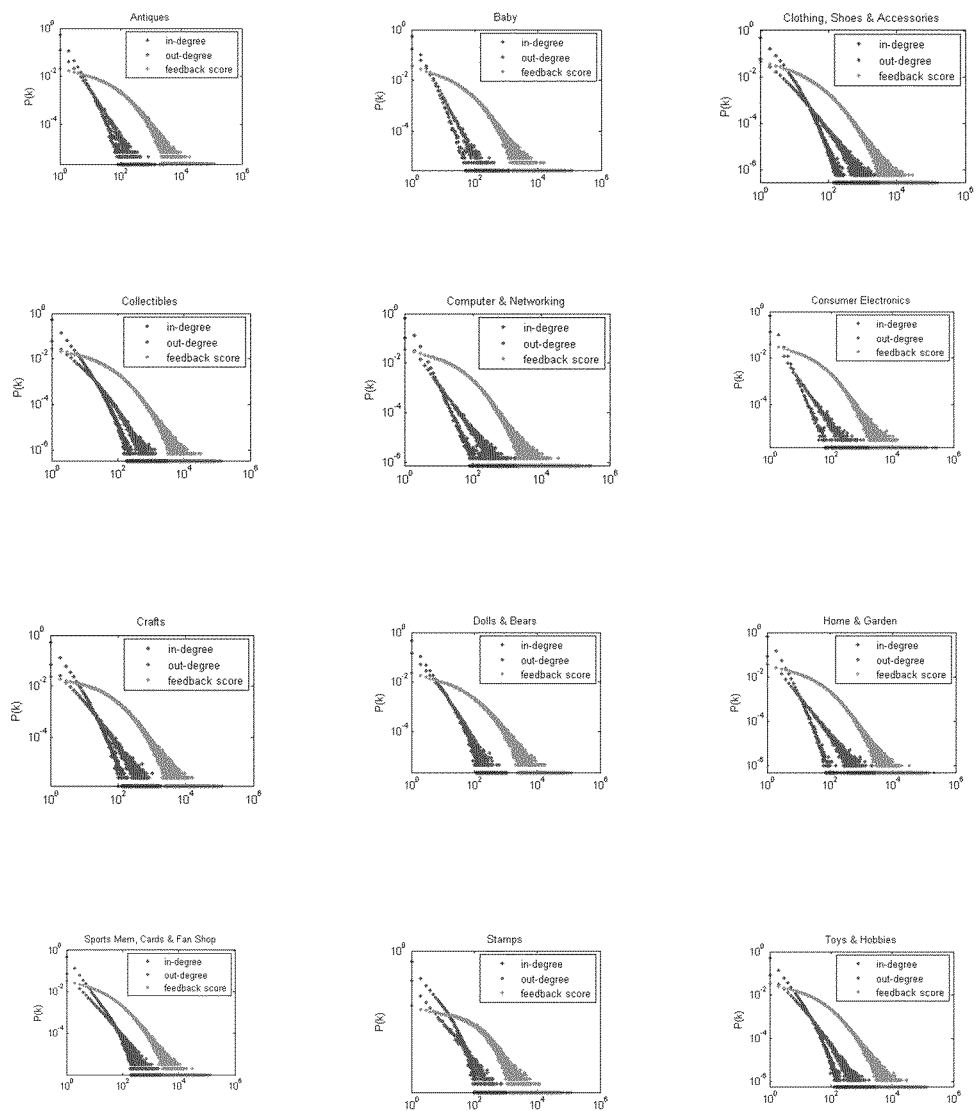
FIG. 5 includes additional examples of degree distribution and feedback distributions within categories in the social commerce network.

FIG. 5 includes additional examples of degree distribution and feedback distributions of sub-networks of twelve representative categories in the social commerce network. Most of the distributions also exhibit the power-law phenomenon. Generally, distribution of feedback scores are more skewed at the lower end than degree distributions.

Figure 6:
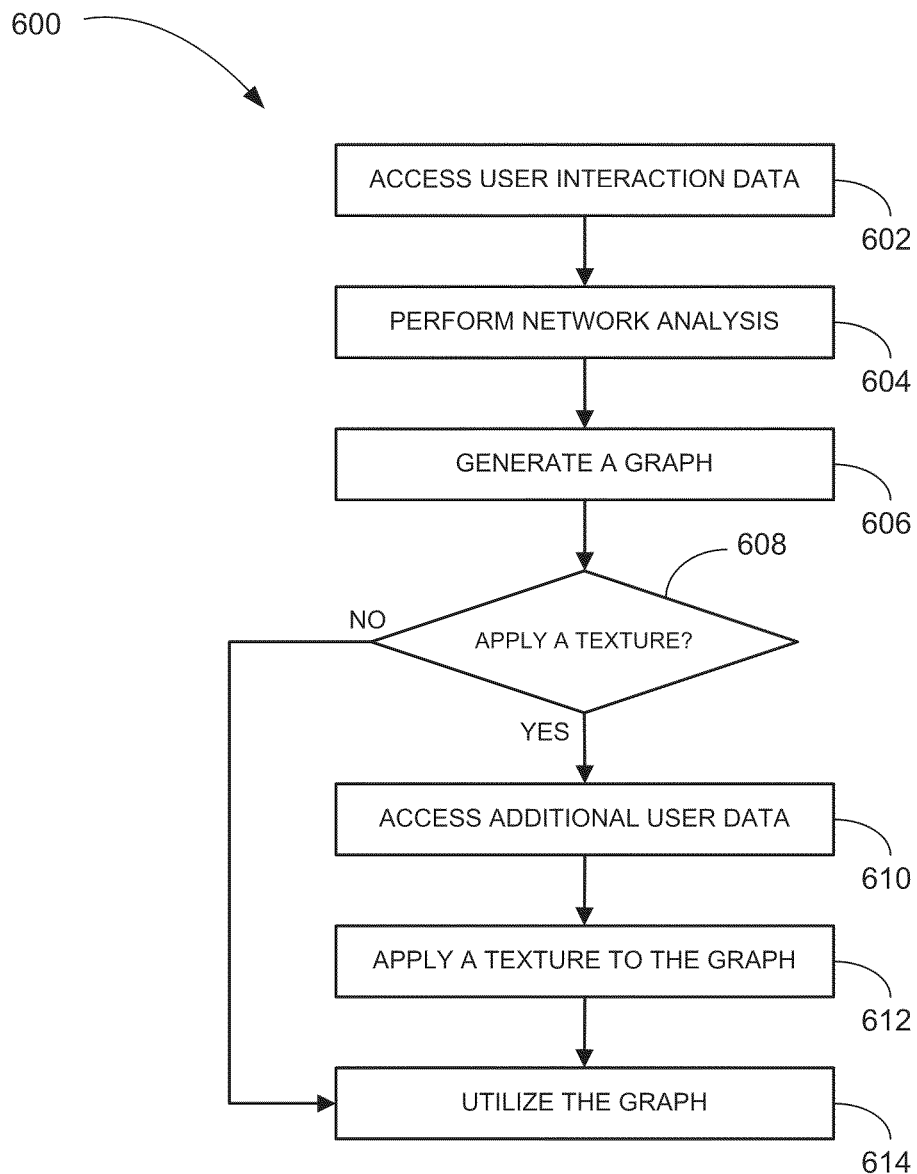
FIG. 6 is a flowchart depicting a method for determining a social strength of a network, according to some embodiments.

FIG. 6 is a flowchart of a method 600 for determining strength of the social commerce network. The strength of the social commerce network may be understood as the number or percentage of members who are actively involved in the social commerce network based on user interaction data. The user interaction data may include data collected over a time period for a number of users in a social commerce network and/or include additional user interaction data associated with the social commerce network during a different time period. The user interaction data may be based on communications between users. For example, the user interaction data may include, by way of example, transactional relationship data that relates to a transaction (e.g., a sale or item exchange) that has occurred between users, communication interaction data that relates to a communication (e.g., an e-mail, an instant message, or a voice over IP call) that has occurred between users, and the like.

A complex network can be separated into six parts: strongly connected component (SCC), in component (IN), out component (OUT), Tendrils, Tubes, and Disconnected. The SCC is the maximal strongly connected component, in which for every pair of nodes u and v, there is a path from u to v and a path from v to u. Nodes from which one reaches the SCC form the IN component, while the OUT component consists of nodes reached from the SCC. There are paths from IN to OUT without going through the SCC. The nodes along these paths form another group called Tubes. The Tendrils component gathers nodes that either can reach the OUT component or are reachable from the IN component, but do not belong to any the other defined regions. The Disconnected component consists of a few nodes that are disconnected to these components.

In the example social commerce network, the SCC contains users that frequently dealt with each other directly or indirectly and may be referred to as "active traders." If a user sells something to a user in the SCC, it may be bought by anyone else in the SCC. The IN component contains users that usually only sell things to the SCC. They could be power members (sellers) of the community. The OUT component contains users that usually only buy things from the SCC. They could be casual or power members (buyers) of the network. Users in Tendrils and Tubes are users only dealt with IN and OUT, but not the SCC. There are also "Disconnected" users, who did not deal with all the users mentioned above.

Referring back to FIG. 6 that illustrates a method 600 according to an example embodiment, the method 600 may be performed by the social strength subsystem 110 (FIG. 1).

User interaction data of a time period for users in a social network (e.g., a social commerce network) is accessed at block 602. The user interaction data may be associated with a single transaction category or multiple transaction categories. In some instances, user interaction data collected over two or more time periods may be accessed and compared using method 600.

Network analysis is performed on the user interaction data at block 604. A graph is generated from the user interaction data in accordance with the performing of the network analysis at block 606. The graph may be a necktie-shaped graph, a bowtie-shaped graph, or be a different shape based on the characteristics of the user interaction data. In addition, the graphs may have different sized dimensions based on a particular representation.

At decision block 608, a determination may be made whether to apply a texture to the graph. If a determination is made to apply a texture, additional user data may be accessed at block 610 and a texture may be applied to the graph in accordance with the additional user data at block 612. The additional user data may include, by way of example, interaction frequency data, reputation information, transactional financial data, or other data associated with the users.

The texture applied to the graph may include colorization, striping, and the like. The texture may better enable a user to more easily understand more about the relationships of the users reflected in the graph. For example, users in a particular component of the graph may be making a large number of interactions or a small number of interactions.

If a determination is made at decision block 608 not to apply a texture or upon completion of the operations at block 612, the method 600 may proceed to block 614.

The graph is utilized for analysis of the social commerce network at block 614. For example, the graph may be provided for presentation.

Figure 7:
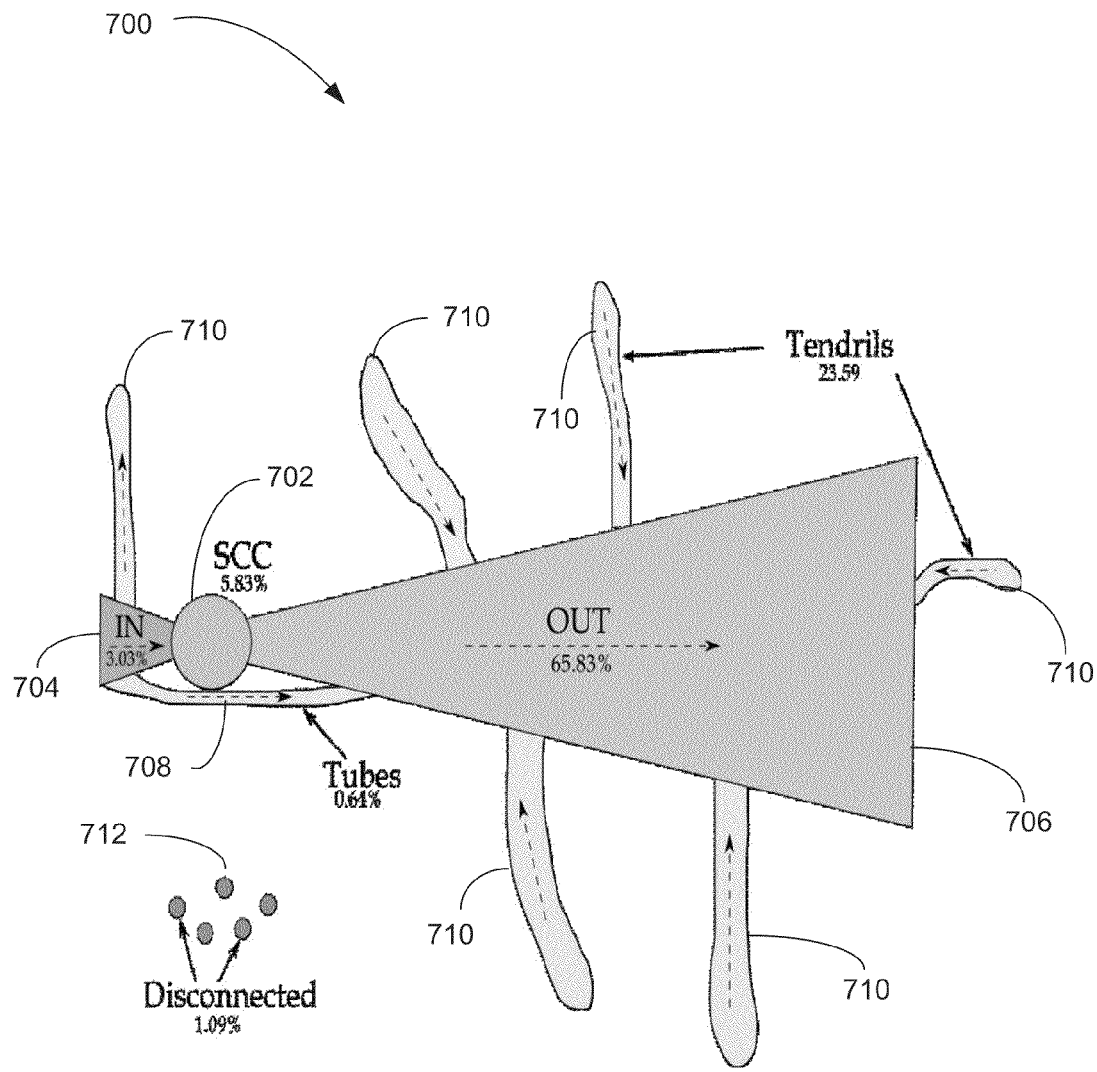
FIGS. 7-11 are example graphs that may be generated using the method of FIG. 6.
Figure 8:
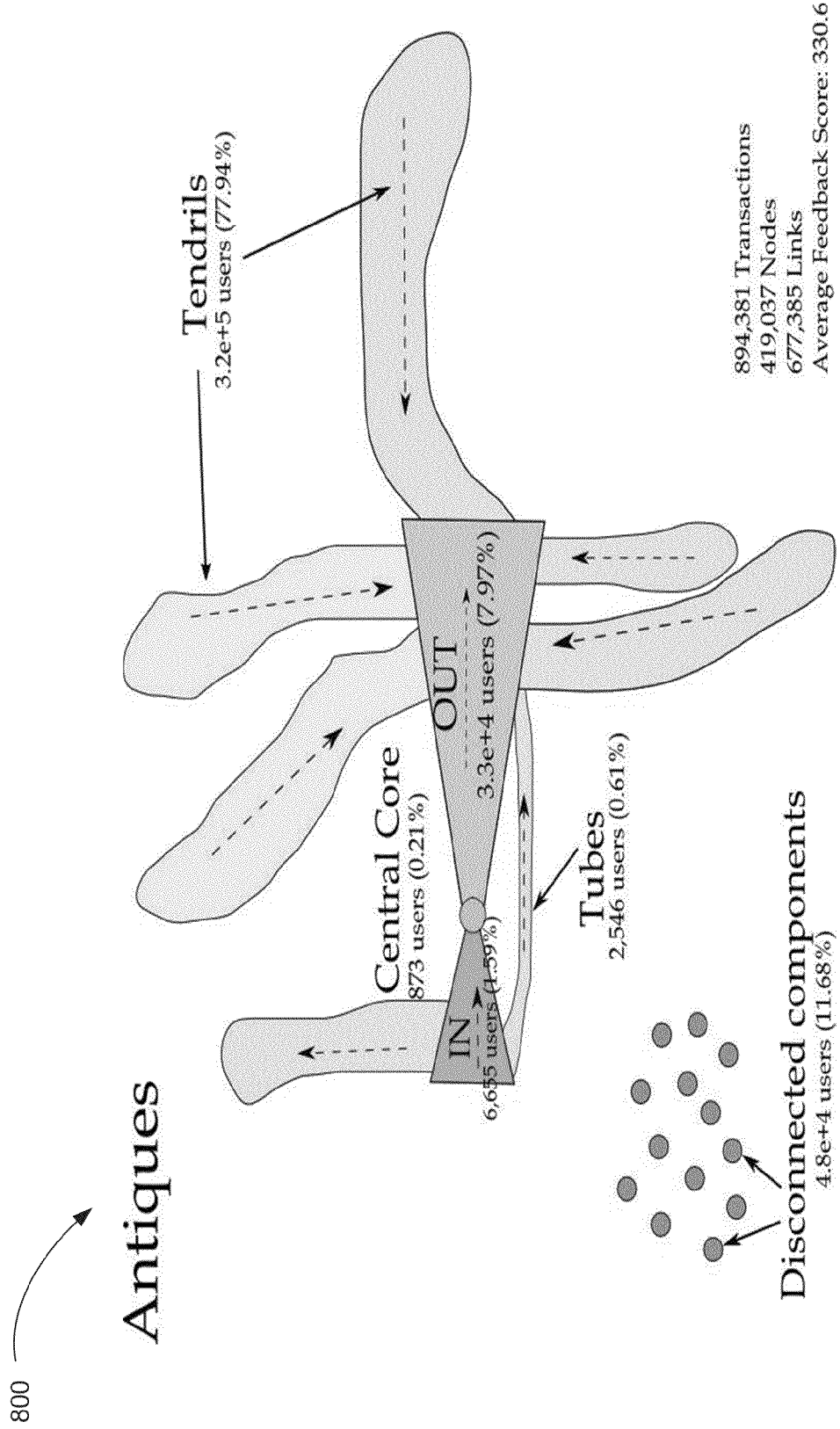
Figure 9:
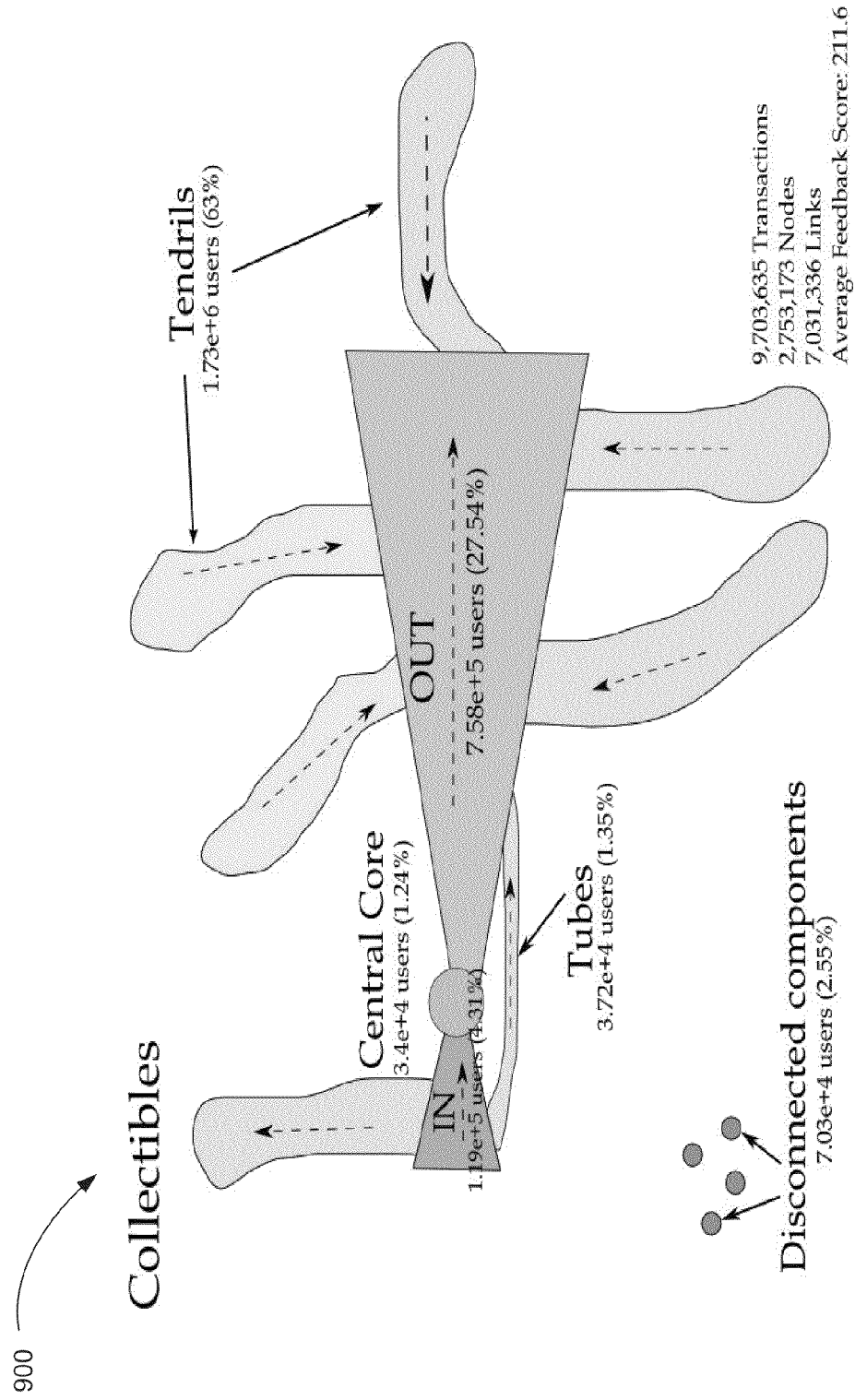
Figure 10:
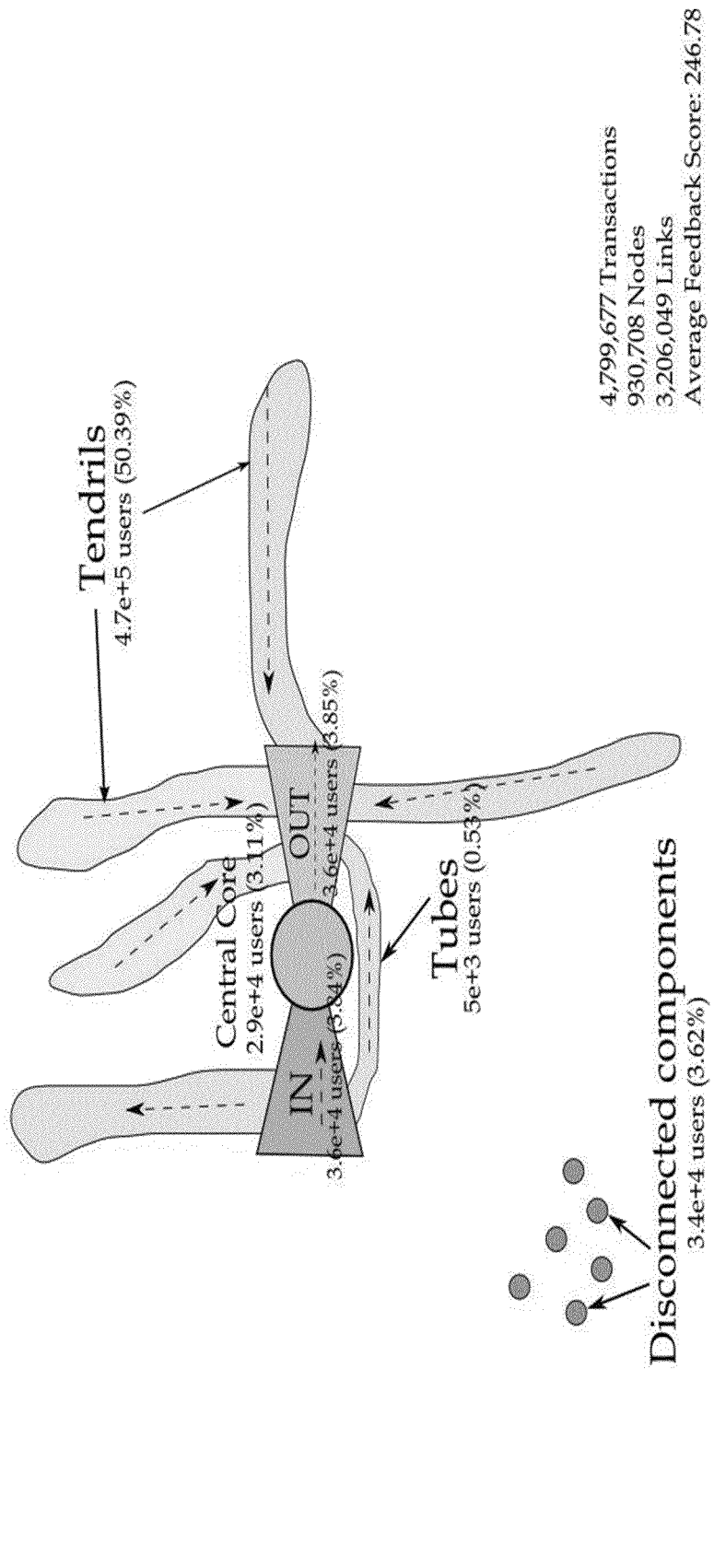
Figure 11:
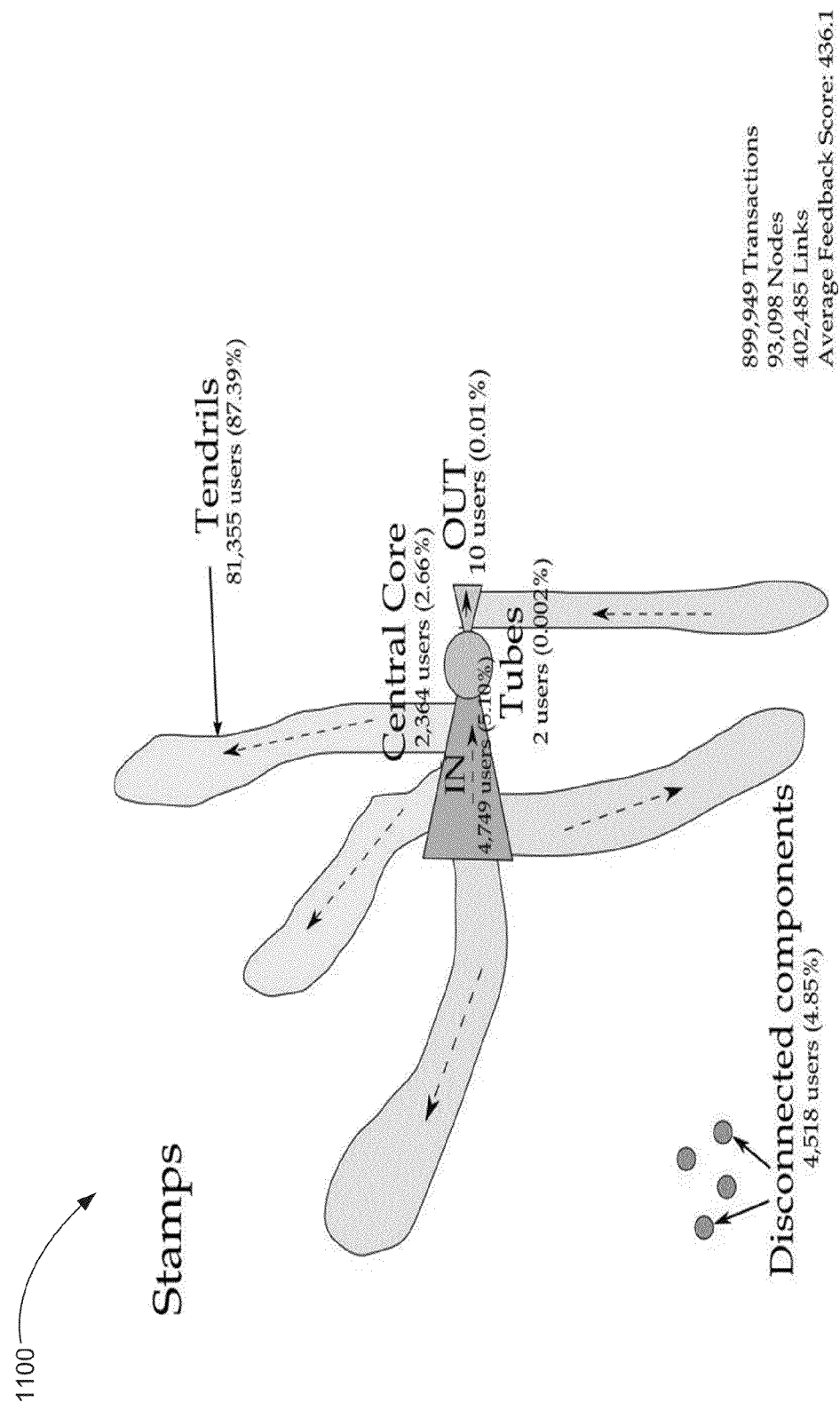

FIG. 7 is a diagram of an example necktie-shaped graph 700 according to an example embodiment. The necktie-shaped graph 700 is an example representation of a graph that may be generated in accordance with the method 600. However, other representations of the same or different types of graphs may also be generated.

A strongly connected component 702 may be connected to an in-component 704 and an out-component 706. While the representation of the example necktie-shaped graph 700 reflects a strongly connected component value of 5.83%, an in-component value of 3.03%, and an out-component value of 65.83%, other values may be used in other representations.

The in-component 704 and the out-component 706 may be connected through a tube 708. The tube value in the presentation representation is 0.64%, however other values may be used in other representations.

One or more tendrils 710 may be connected to the in-component 704 or the out-component 706. However, a different number of tendrils 710 may be used in a different representation. The tendril value in the presentation representation is 23.59%, however other values may be used in other representations.

A disconnected component 712 may not be connected to the strongly connected component 702, the in-component 704, the out-component 706, the tube 708, and/or the tendrils 710. The disconnected component value in the presentation representation is 1.09%, however other values may be used in other representations.

In order to find out the characteristic of each component, the feedback scores, number of purchase and sales of each component in the social commerce network are measured. Users in the SCC are active with an average of 14.16 purchases and 55.83 sales. Users in SCC sell more than buy. Users in IN are mainly sellers, who made 63.84 sales while only 0.42 make purchases on average. Users in OUT are buyers, who made 6.48 purchases and only 0.21 sales on average. Also the users in OUT are typically casual users. The SCC and IN have the highest average feedback scores. The users in the tubed 708 have relatively high feedback scores. These are experienced users.

FIGS. 8-11 are diagrams of example graphs 800, 900, 1000, and 1100 according to example embodiments. Each of the graphs 800, 900, 1000, and 1100 include a strongly connected component, an in-component, an out-component, a tube, one or more tendrils, and a disconnected component. The graph 800 may represent an Antiques category, the graph 900 may represent a Collectibles category, the graph 1000 may represent a Sports Memorabilia and Cards category, and the graph 1100 may represent a Stamps category.

FIG. 12 illustrates a block diagram of an example table 1200 generated using the method 600 (see FIG. 6). The table 1200 is an example representation that may reflect a distribution of various components of a graph (e.g., the necktie-shaped graph 700 of FIG. 7). However, other representations containing different values and/or components may also be used.

For example, the size row 1202 of the table 1200 may reflect a size percentage of various components of a graph. The average feedback row 1204 may contain values that reflect an average feedback store of users associated with a particular component. The purchases row 1206 may contain values that reflect an average and percentage of purchases associated with a particular component. The sales row 1208 may contain values that reflect an average and percentage of sales associated with a particular component. The columns 1210-1220 are associated with particular components of a graph.

Figure 13:
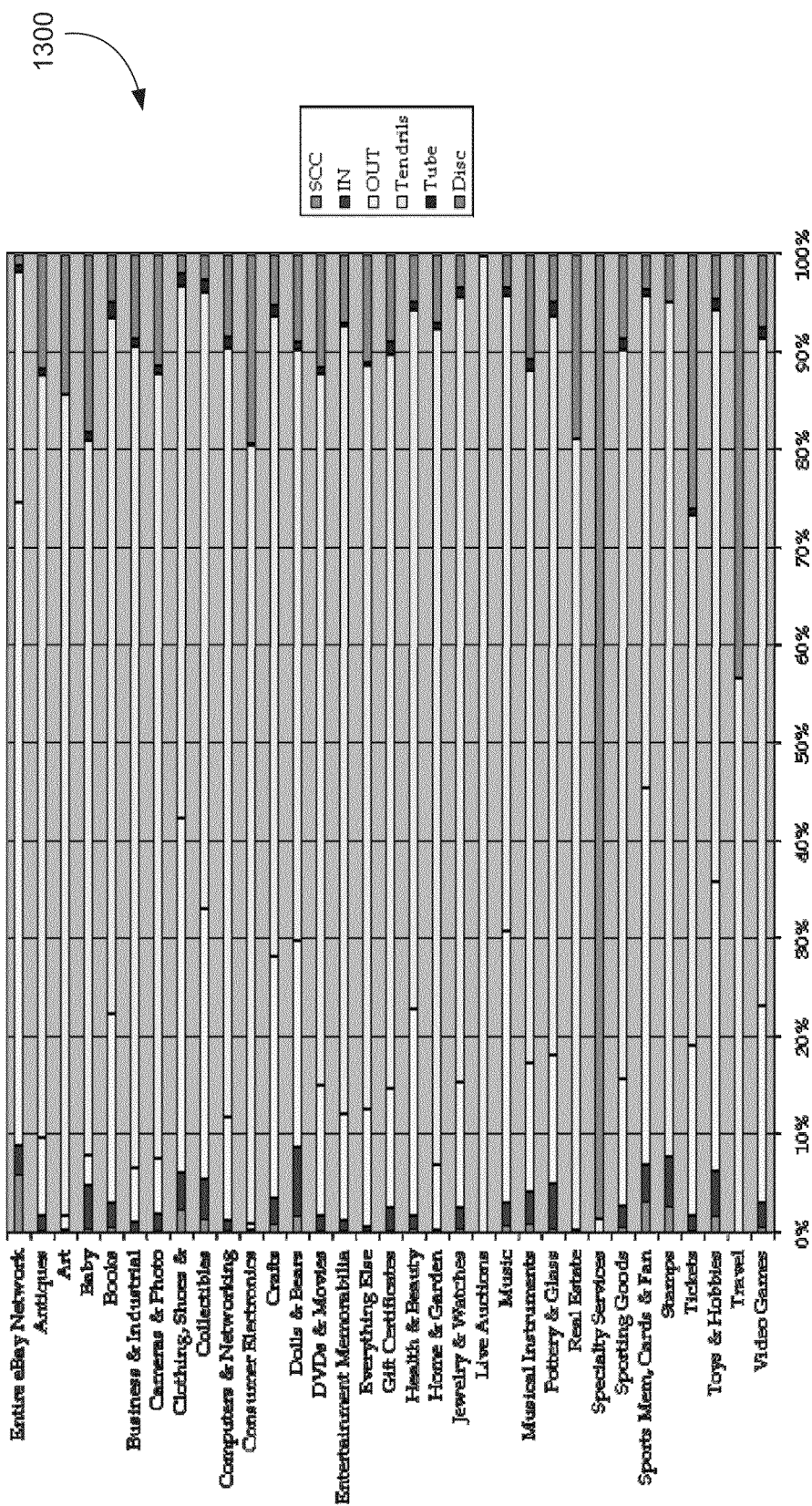
FIG. 13 is an example bar graph comparing how the social strength of the social commerce network changes on a per-category basis.

FIG. 13 is an example bar graph 1300 comparing how the social strength of the social commerce network changes on a per-category basis. First, the size of SCC, which indicates the size of active community in each category, is compared. The average percentage of SCC is 0.61%, and the standard deviation is 0.8%. The categories with relatively larger SCC (more than one standard deviation larger than the average value) are Toys & Hobbies, Stamps, Sports Memorabilia, Cards & Fan Shop, Dolls & Bears, Crafts, Collectibles, Clothing, and Shoes & Accessories. Most of them are collectible merchandises, with which strong communities of collectors are more often formed. The five categories with the smallest SCC are Specialty Services, Live Auctions, Travel, Consumer Electronics and Real Estate. These categories either have large Tendrils or Disconnected components. They are more like traditional retail networks, in which entities are either buyers or sellers. There are few trading relations between peer buyers or sellers.

In addition, a measurement indicating how asymmetric the bow-tie structures are based on the ratio of size of OUT over size of IN may be determined (see, for example FIGS. 7-11). The average value of the ratio is 7.25 with a standard deviation of 6.25. The categories with large OUT-IN ratios are Everything Else (30.0), Health & Beauty (15.5) and Home & Garden (20.4). These Categories have much more active buyers than active sellers. Baby, Stamps, Specialty Services, Travel, and Live Auctions are the categories whose IN component is larger than OUT component.

Next, the individual categories with the social commerce network may be compared. The SCC, IN, and OUT components of the social commerce network are aggregations of corresponding components in the sub-networks. When two sub-networks are merged, the new SCC is at least the union of two SCCs if those two intersect with each other. In addition, vertices in IN and OUT can also become part of the SCC.

Therefore, the percentage of SCC in the social commerce network increases. The Tendrils component is much less significant than those of individual categories. Since the IN component does not increase significantly, most of the vertices moved from the Tendrils into the OUT component. In other words, a large number of casual users in Tendrils of a category are likely to be active buyers in some other categories.

Social commerce is used to build communities around common commercial interests, such that transactions and revenues can be maximized. Therefore, the social strength of the networks is measured. In the tie model of FIG. 7-11, the SCC component is the closely connected center community, which includes the most active users. The IN and OUT are power members. The Tendrils and Tube are relatively casual members. Different components show different levels of social participation and trading activities. In other words, they have different level of contribution to the total social strength. Therefore, the measurement for the social strength of a social commerce network is based on its tie structure. The measurement is a linear combination of proportions of the components except the Disconnected component, because there is few activities in this part. For example, the social strength of a social commerce network may be calculated by:

$$SocialStrength = a_1 * SCC + a_2 * IN + a_3 * OUT + a_4 * Tube + a_5 * Tendrils$$

where the coefficients $a_1$, $a_2$, $a_3$, $a_4$, and $a_5$ are the weights on the component. The coefficient may be used to express how much a vertex in each component can contribute to the total social strength. Therefore, it may be desirable to select the coefficients so that:

$$a_1 > a_2 = a_3 = a_4 > a_5.$$

Figure 14:
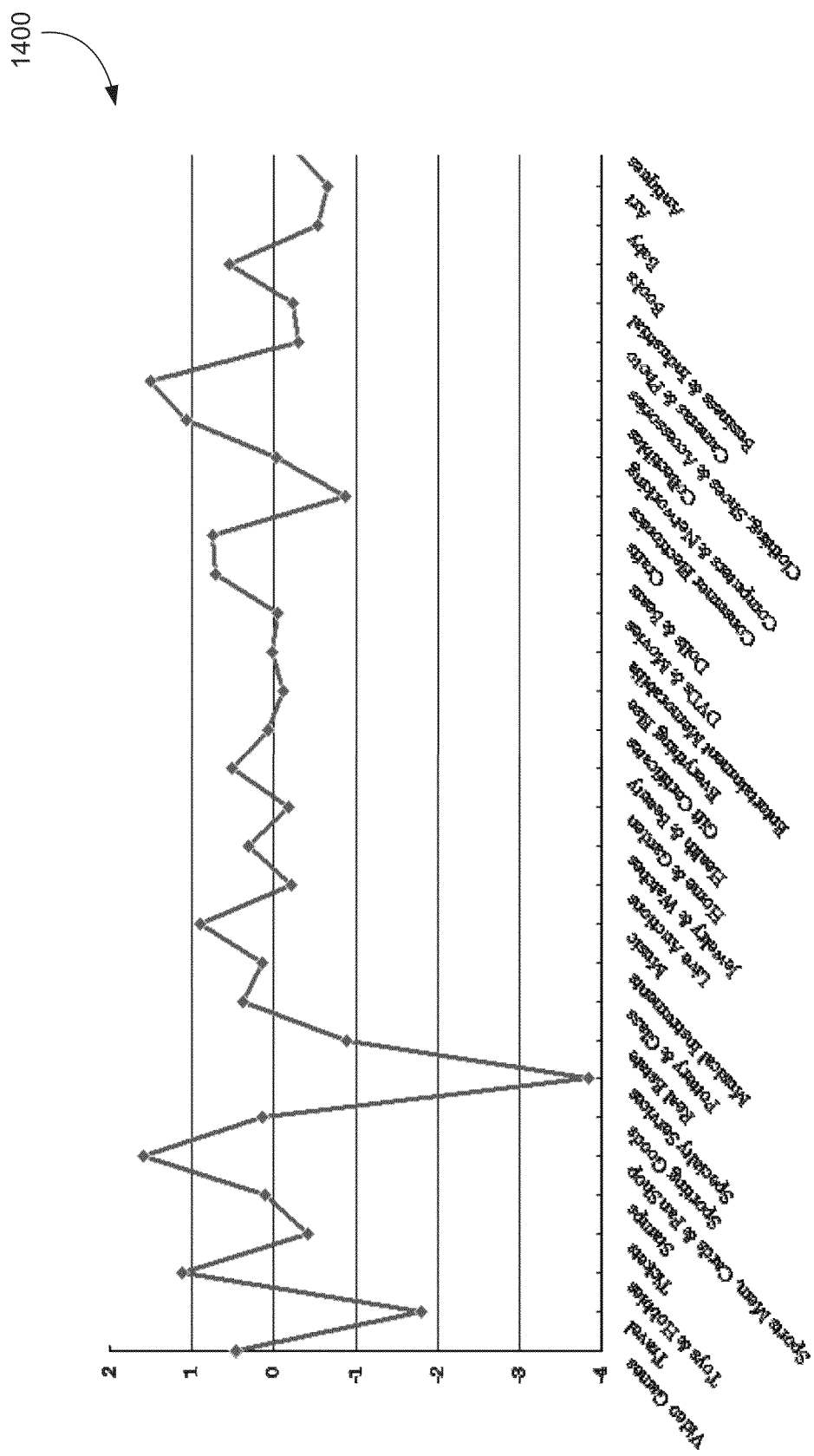
FIG. 14 is an example graph of relative social strength across a number of categories.

For example, {1.0, 0.5, 0.5, 0.5, 0.25} may be selected to be the weights. The results are depicted in FIG. 14. In FIG. 14, it is shown that categories with high social strength include Toys & Hobbies, Sports Mem, Cards & Fan Shop, Music, Dolls & Bears, Crafts, Collectibles, and Clothing Shoes & Accessories, which tracks observations based on collected data. Travel, Specialty Services, and Computers & Networking are categories without a strong social community. Travel and Specialty Services are relatively immature with small numbers of transactions. The Computer & Networking is a typical retailer mode, in which there are not many social interactions involved.

In addition to analyzing the social commerce network using the degree distribution and the social strength measures, the local structure is also analyzed. The local structure can be revealed by isolating recurring small connected sub-networks in the network, referred to as motifs. Motifs are those patterns for which the probability P of appearing in a randomized network an equal or greater number of times than in the real network is lower than a cutoff value (here, for example, P=0.01). In other words, motifs are small connected sub-networks that occur in significantly higher frequencies than would be expected in random networks with similar node characteristics.

Figure 15:
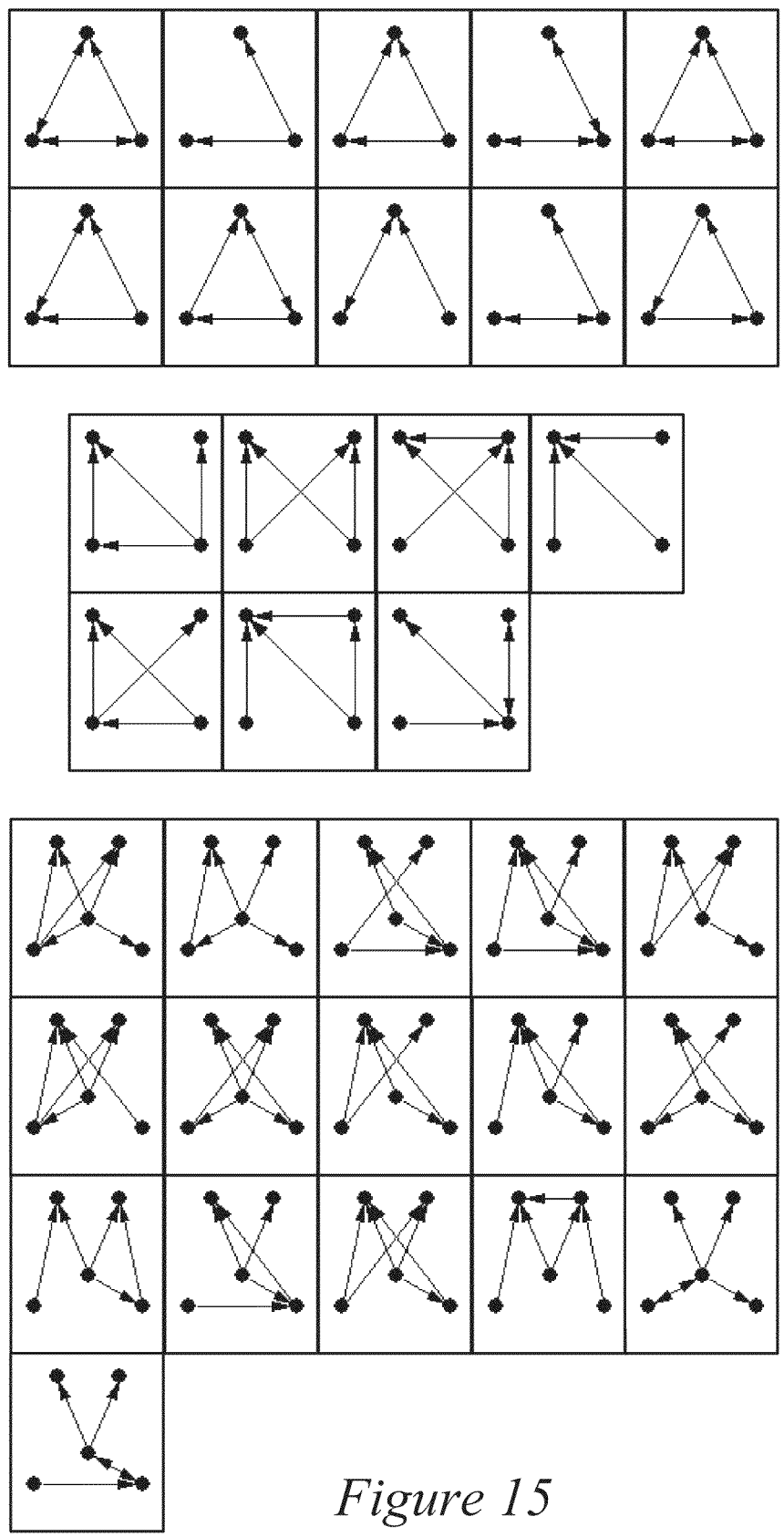
FIG. 15 depicts examples of motifs, according to some embodiments.

FIG. 15 depicts examples of motifs, according to some embodiments. Motif detection may provide some insights to the local structure of complex networks, while most complex network measurements can only give global knowledge of the network. Common motifs may imply common network functionality and reveal structural evolution principles of complex networks.

One measure is that of significance profiles of the sub-networks. The significance Z, of a sub-network i is computed by comparing its appearances in the real network to that in randomly generated networks with the same degree distribution. For example, $$Z_i = (Nreal_i - \langle Nrand_i \rangle)/std(Nrand_i)$$

where $Nreal_i$ is the count of appearances of the sub-network i in the real network, and $\langle Nrand_i \rangle$ and $std(Nrand_i)$ are the mean and standard deviation of its appearances in the randomly generated networks. The significance profile (SP) is the normalized vector of $Z_i$:

$$SP_i = Z_i / (\Sigma Z_j^2)^{1/2}$$

In some embodiments, triad significance profiles (TSP) are computed. The TSPs are the significances of the 13 possible directed connected triads (e.g., three-node motifs). To compute the SP for a n-node sub-network, all n-node sub-networks in a network are numerated, which is computationally intensive with time complexity of $O(|V|^n)$. In one instance, FANMODError! Reference source not found, a fast network motif detection tool was used. The TSP may only be calculated for relatively small categories, including Baby, Dolls & Bears, DVD & Movies, Stamps, and Crafts and Consumer Electronics. The results are depicted in FIG. 16.

Figure 16:
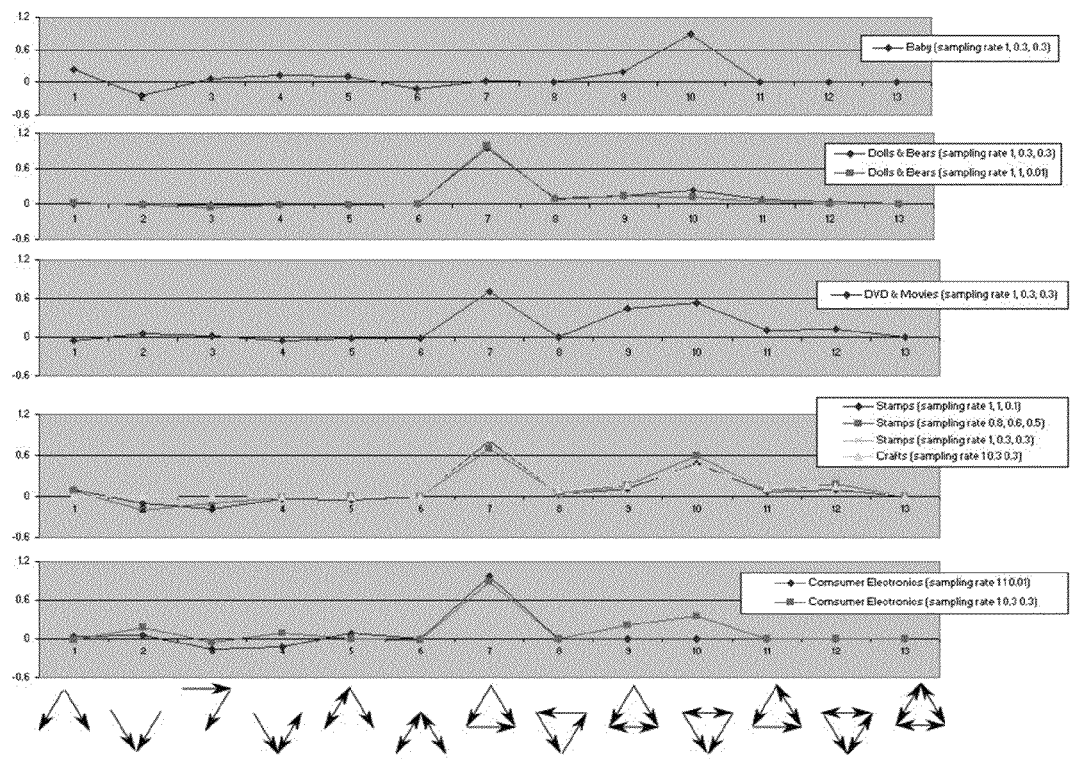
FIG. 16 is an example graph based on a motif analysis according to some embodiments.

Based on FIG. 16, the categories except Baby show similar patterns, in which triad 7, 9, and 10 are strong. The triad 7, feed-forward loop, is the most significant one in the social commerce network. The sub-network of Baby has very strong triad 10, but insignificant triad 7, which might due to sampling errors.

For complex networks, significant connected sub-networks, such as triads 7, 9, and 10 in the social commerce networks, are termed "network motifs." Motifs can be thought of as essential building blocks of complex networks. The local structure of a network may be shown by presenting its motifs. Moreover, semantic information into the motifs may be incorporated into the motifs. Vertices can be colored by corresponding users' feedback scores. For example, triads with the same linking structure, but different coloring of vertices are considered different. In the depicted example, the continuous feedback score was divided into nine ranges and colored the vertices accordingly. The 4-node colored motifs are searched in Stamps and Antiques categories. The top ten motifs of both categories are listed in FIG. 18.

Figure 17:
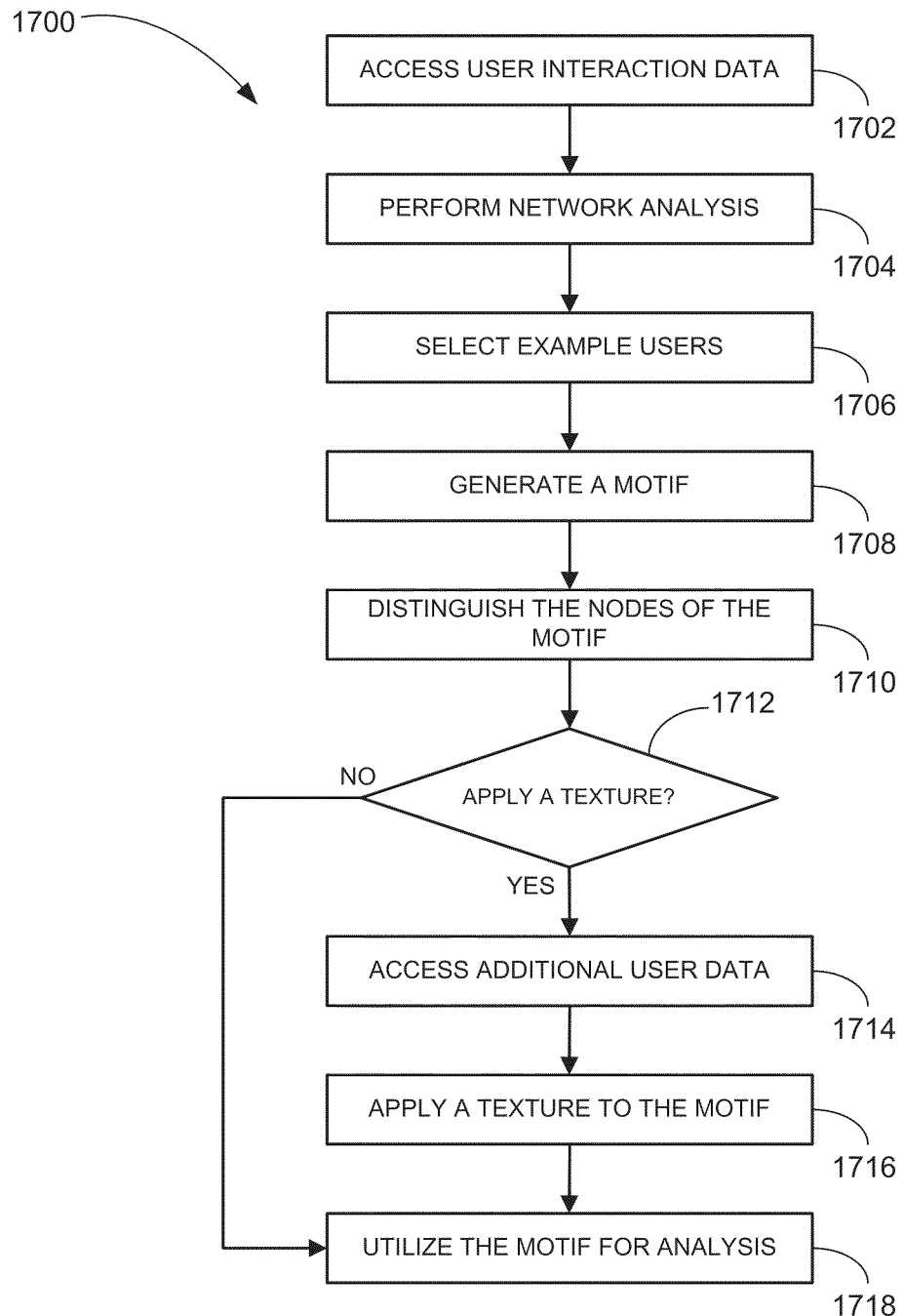
FIG. 17 illustrates a method for conducting motif analysis according to an example embodiment.

FIG. 17 illustrates a method 1700 for the conducting motif analysis according to an example embodiment. The method 1700 may be performed by the motif subsystem 112 (FIG. 1).

User interaction data associated for users for a time period in a social network (e.g., a social commerce network) is accessed at block 1702. Network analysis is performed on the user interaction data at block 1704. The user interaction data may be collected over more than one time period. The data from the time periods may be compared.

Example users within the social commerce network are selected at block 1706. The example users may be associated with reputation information (e.g., user feedback).

A motif for the example users for the time period is generated in accordance with the performing of the network analysis at block 1708. A node of the motif may be associated with an example user. The motif may define an expected relationship between a number of example users in the social commerce network. For example, a four node motif may be generated.

The node of the example users may be distinguished in accordance with the reputation information of a respective example user at block 1710. For example, the node of the example users may be colored in accordance with the reputation information.

At decision block 1712, a determination may be made whether to apply a texture to the motif. If a determination is made to apply a texture, additional user data may be accessed at block 1714 and the texture may be applied to one or more connected lines of the motif in accordance with the additional user data at block 1716. For example, the additional user data may include interaction frequency data and/or transaction financial data associated with the users. If a determination is made not to apply the texture at decision block 1712 or upon completion of the operations at block 1716, the method 1700 may proceed to the block 1718.

The motif with the distinguished nodes may be utilized for analysis of the social commerce network at block 1718. For example, the motif with the distinguished nodes may be provided for presentation. In some instances, the method 1700 may be repeated using user interaction data collected over other time periods.

Figure 18:
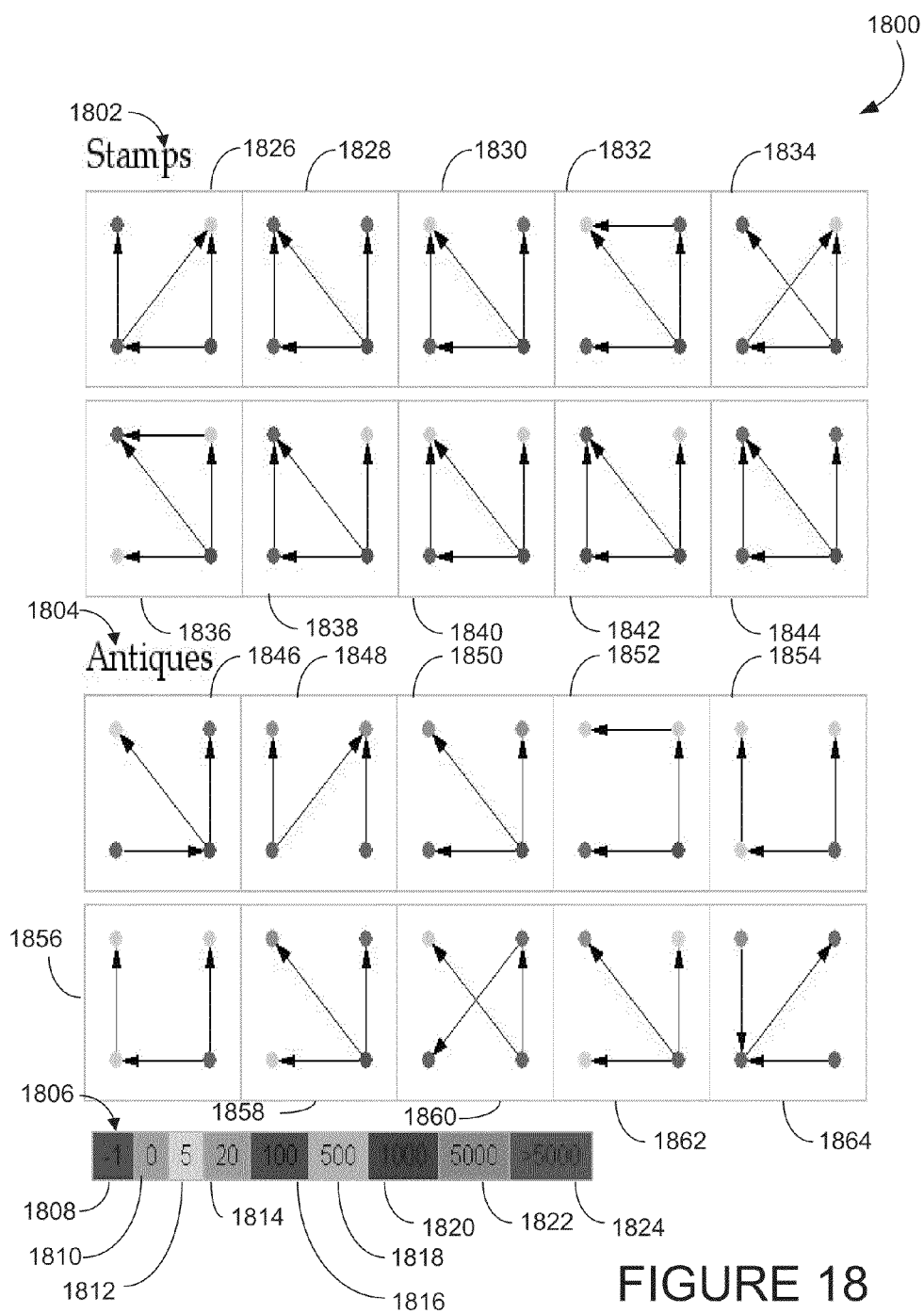
FIG. 18 is an example motif display according to an example embodiment.

FIG. 18 is an example motif display 1800 according to an example embodiment. The motif display 1800 is an example representation of four node motifs from two categories of a social commerce network. However, motifs may be made for other categories of the social commerce network or the entire social commerce network. Motifs containing a different number of nodes may also be used.

The motif display 1800 includes a number of motifs 1826-1844 for a first category 1802 and a number of motifs 1846 for a second category 1864. The motifs in two categories are very different. In stamps category, the motifs suggest that there are second tier sellers, who bought from users with higher reputation and sold to users will lower reputation. This structure is not presented in the motifs of antiques category.

A distinguishing legend 1806 may include a series of distinguishing levels 1880-1824 that reflect different reputation information associated with users of the motifs 1826-1864. For example, the nodes of the motif 1826 includes a first node with a distinguishing level 1818, a second node with a distinguishing level 1820, a third node with a distinguishing level 1822, and a fourth node with a distinguishing level 1824.

In addition to studying motifs to analyze the local structure of the social commerce network, preferential connections between users may be analyzed. People with many connections tend to know others with many connections. For the social commerce network, the users' tendency to deal with others with respect of their feedback scores is analyzed. In other words, "Do users with high feedback scores tend to deal with users that also have high feedback scores?" Assortative mixing may be used to show the extent to which nodes connect preferentially to other nodes with similar characteristics. Social commerce networks often show positive assortativity.

Figure 19:
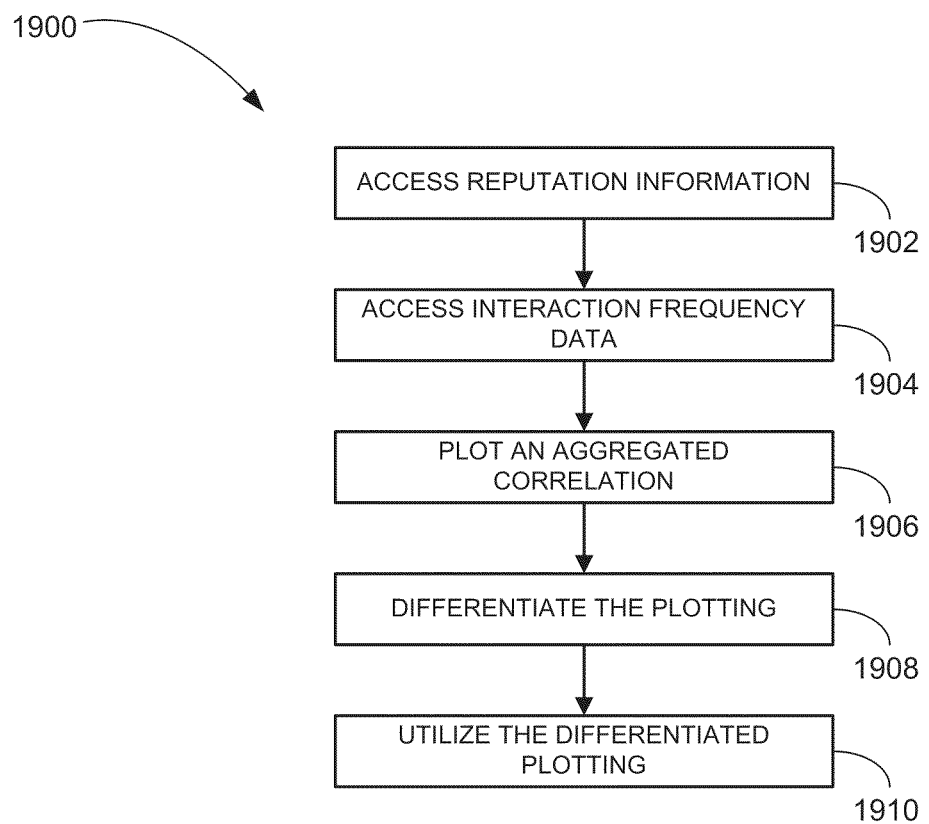
FIG. 19 is a flowchart of a method for differentiated plotting analysis according to an example embodiment.

FIG. 19 illustrates a method 1900 for differentiated plotting analysis according to an example embodiment. The method 1900 may be performed by the preferential connections subsystem 114 (FIG. 1).

Reputation information associated with a number of initiating users and a number of responding users in a social commerce network for a time period is accessed at block 1902.

Interaction frequency data associated with the initiating users and the responding users for the time period is accessed at block 1904. An aggregated correlation between the initiating users and the responding users is plotted in accordance with the reputation information at block 1906.

The plotting of the aggregated correlation is differentiated in accordance with the interaction frequency data at block 1908. In an example embodiment, the differentiated plotting may be used to determine users' tendency to interact with others with respect of their reputation information (e.g., feedback scores). For example, the differentiated plotting may help identify whether users with high reputation information (e.g., high feedback scores) tend to interact with other users that also have high reputation information. Assortative mixing may be used to show the extent to which nodes (e.g., users) connect preferentially to other nodes with similar characteristics.

Figure 20:
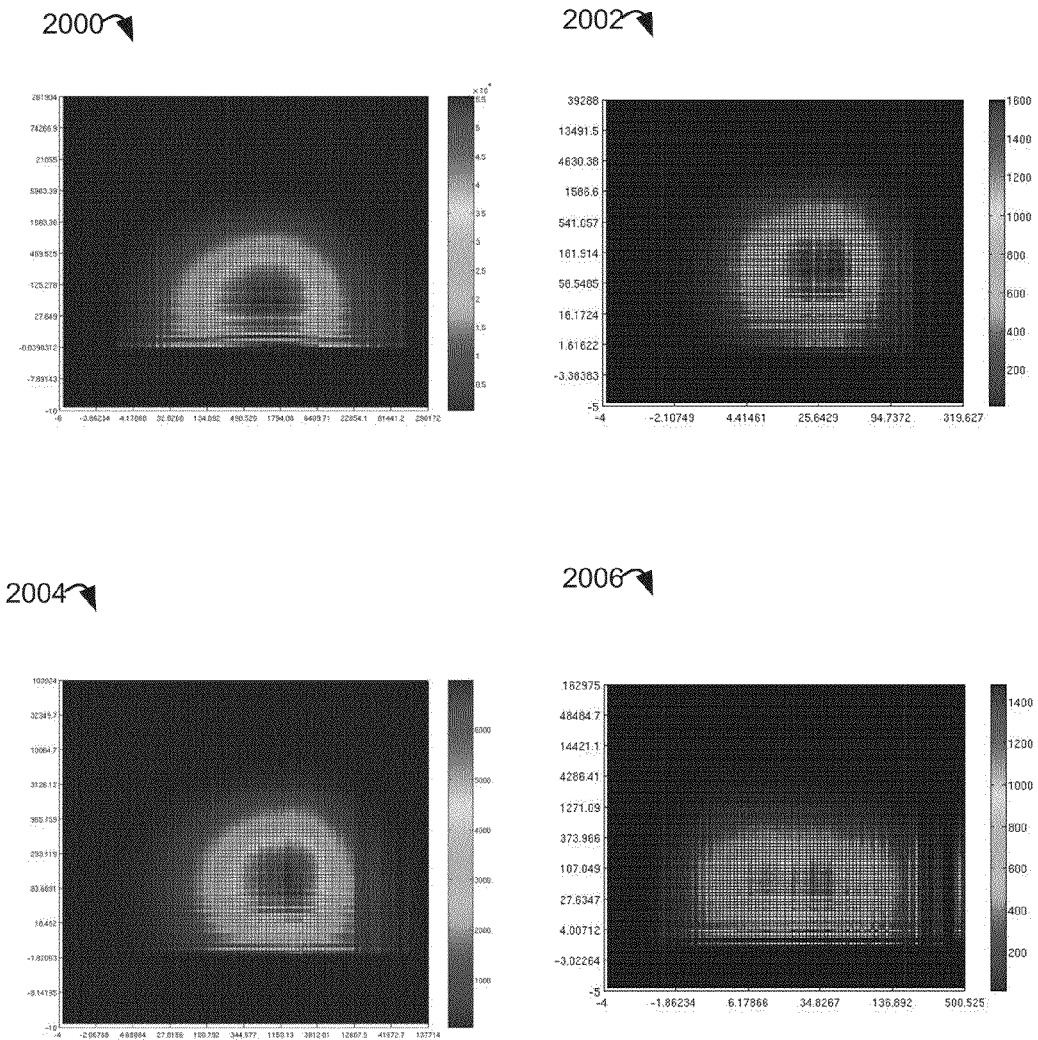
FIG. 20 depicts example Auroral diagrams generated according to some embodiments.
Figure 21:
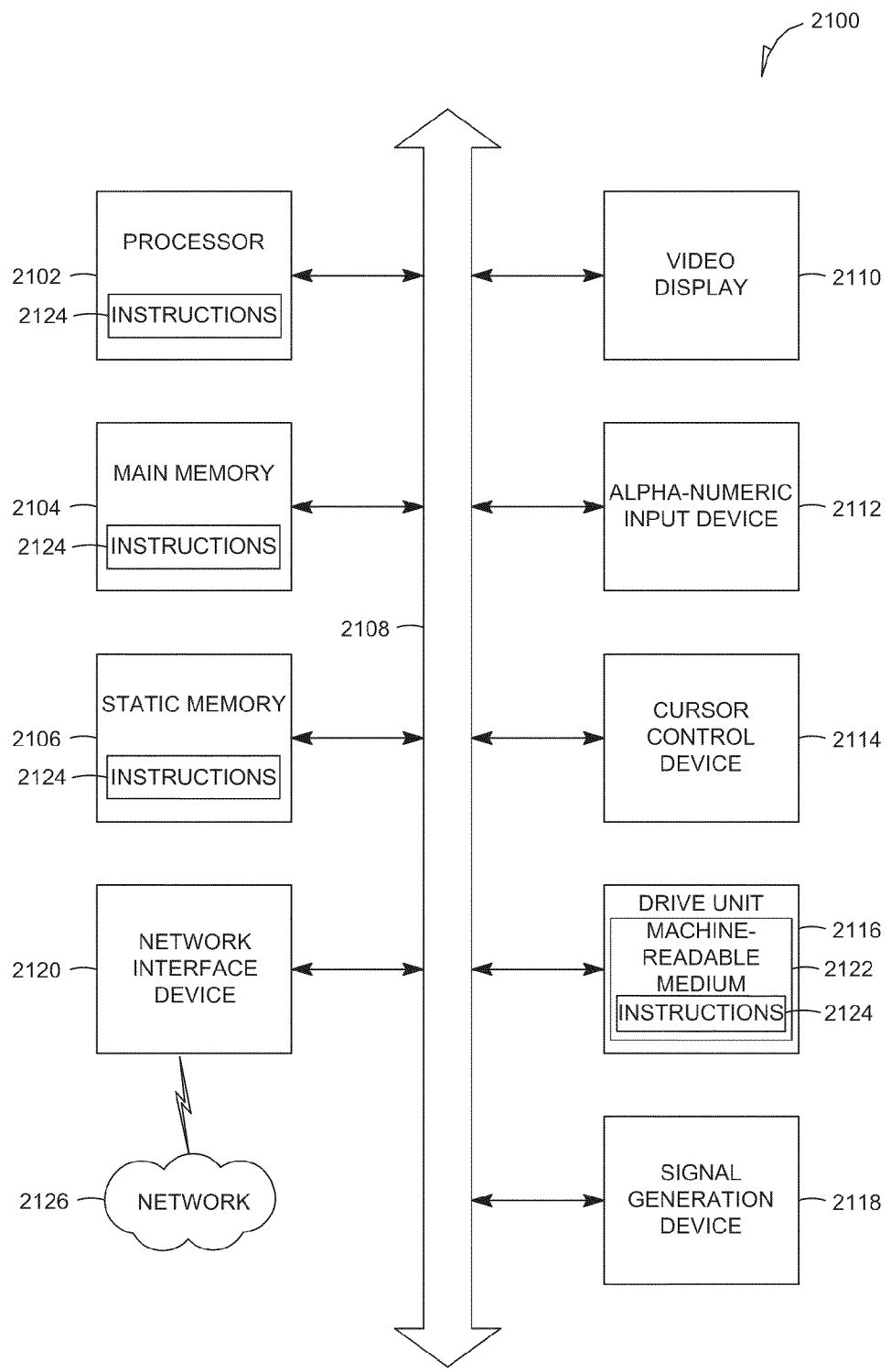
FIG. 21 is a block diagram of a machine in the example form of a computer system within which instructions, for causing the machine to perform any one or more of the methodologies discussed herein, may be executed.

With reference to FIG. 20, the aggregated correlation between sellers' feedback scores and buyers' feedback scores was plotted. In an Auroral diagram, the x-axis denotes sellers' feedback scores, and the y-axis denotes buyers' feedback scores. Both axes are logarithmically binned. The color of each block is determined by the number of transactions happened between pairs of users with corresponding feedback scores.

Referring again back to FIG. 19, the differentiated plotting of the aggregated correlation is utilized at block 1910. For example, the differentiated plotting of the aggregated correlation may be provided for presentation.

FIG. 20 depicts example Auroral diagrams. Diagram 2000 is based on all transactions in the social commerce network. Diagram 2002 is based on transactions in the crafts category. Diagram 2004 is based on transaction in the collectible category. Diagram 2006 is based on transactions in the computers and networking category. Diagram 2000 that shows that most transactions happened between buyers with feedback values within [0, 300] and sellers with feedback values within [150, 5000]. Sellers with feedback close to 0 only made a few sales, while buyers with feedback close to 0 made a lot of purchases. This suggests that new buyers are much easier to "survive" in the social commerce network than new sellers. Buyers with negative feedbacks made very few transactions indicating their vulnerability in this network. Comparing crafts and collectibles, collectibles are more welcoming to new buyers. Computers and networking category is very different. The core is squeezed. Sellers with a wider range of feedback scores do well in this category.

Modules, Components and Logic

Certain embodiments of subsystems as described herein may be implemented as logic or a number of modules, components, or mechanisms. A module, logic, component, or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g. a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

An example embodiment extends to a machine in the example form of a computer system 2100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a user interface (UI) navigation device 2114 (e.g., a mouse), a disk drive unit 2116, a signal generation device 2118 (e.g., a speaker) and a network interface device 2120 to communicate via a communications network 2126.

Machine-Readable Medium

The disk drive unit 2116 includes a non-transitory machine-readable medium 2122 on which is stored one or more sets of instructions and data structures (e.g., software 2124) embodying or utilized by any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting machine-readable media.

While the non-transitory machine-readable medium 2122 is shown in an example embodiment to be a single medium, the term "non-transitory machine-readable medium" may include a single medium or multiple media (e.g., a centralized or distributed database, and/or associated caches and servers) that store the one or more instructions. The term "non-transitory machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "non-transitory machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 2124 may further be transmitted or received over the communications network 2126 using a transmission medium via the network interface device 2120 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server And Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
retrieving, using one or more processors, a strongly connected component value, an in-component value, an out-component value, a disconnected component value, a tendril value, and a tube value of a social network for a time period;
the strongly connected component value quantifying a number of strongly connected vertices where, for each strongly connected vertex, there is a first path from a first vertex to a second vertex and a second path from the second vertex to the first vertex, the first vertex and the second vertex corresponding to a first user and a second user, respectively, who act as buyers and sellers in transactions between themselves in the social network;
the in-component value quantifying a number of in vertices, each in vertex corresponding to a third user who acts as a seller to the first user;
the out-component value quantifying a number of out vertices, each out vertex corresponding to a fourth user who acts as a buyer from the second user;
the tube value quantifying a number of tube vertices, each tube vertex being between the third user and the fourth user that do not include the first user and the second user;
the tendril value quantifying a number of tendril vertices, each tendril vertex being a buyer from the third user or a seller to the fourth user but have not conducted a transaction with the first user or the second user;
the disconnected component value quantifying a number of vertices that are not quantified by the strongly connected component value, the in-component value, the out-component value, the tendril value, or the tube value;
calculating, by the one or more processors, a social strength of the social network for the time period by applying a weighting factor to each of the strongly connected component value, the in-component value, the out-component value, the disconnected component value, the tendril value, and the tube value and summing the weighted values; and
utilizing the social strength of the social network for the time period for analysis of the social network,
wherein the strongly connected component value has the greatest weight and the disconnected component value has the lowest weight.

2. The method of claim 1, wherein the retrieving comprises:
determining the strongly connected component value in accordance with a graph percentage of a strongly connected component of the social network;
determining the in-component value in accordance with the graph percentage of an in-component of the social network;
determining the out-component value in accordance with the graph percentage of an out-component of the social network;
determining the disconnected component value in accordance with the graph percentage of a disconnected component of the social network;
determining the tendril value in accordance with the graph percentage of one or more tendrils of the social network; and
determining the tube value in accordance with the graph percentage of a tube of the social network.

3. The method of claim 1, wherein the utilizing comprises:
providing the social strength of the social network for the time period for presentation.

4. The method of claim 1, wherein the utilizing comprises:
retrieving the strongly connected component value, the in-component value, the out-component value, the disconnected component value, the tendril value, and the tube value of the social network for an additional time period;

calculating, by the one or more processors, the social strength of the social network for the additional time period by combining the strongly connected component value, the in-component value, the out-component value, the disconnected component value, the tendril value, and the tube value; and using the social strength of the social network for the time period and the additional time period for analysis of the social network.

5. The method of claim 4, wherein the using comprises:
providing a difference between the social strength of the social network for the time period and the additional time period for presentation.

6. The method of claim 1, wherein the utilizing comprises:
providing the social strength for a plurality of categories in the social network for the time period for presentation;
wherein the social strength is calculated for the plurality of categories in the social network for the time period.

7. The method of claim 6, further comprising:
retrieving the strongly connected component value, the in-component value, the out-component value, the disconnected component value, the tendril value, and the tube value of the social network for an additional time period;

calculating, by the one or more processors, the social strength of the social network for the additional time period by combining the strongly connected component value, the in-component value, the out-component value, the disconnected component value, the tendril value, and the tube value; and using the social strength for a plurality of categories of the social network for the time period and the additional time period for analysis of the social network,
wherein the social strength is calculated for the plurality of categories in the social network for the time period and the additional time period.

8. The method of claim 1, wherein a weight of the strongly connected component value is double the weight of the in-component and the out-component and the weight of the disconnected component value is half the weight of the in-component and the out-component in the summing.

9. The method of claim 1, wherein the social network is an online marketplace.

10. A method comprising:
retrieving, using one or more processors, a strongly connected component value, an in-component value, an out-component value, a disconnected component value, a tendril value, and a tube value of a social network for a time period;

the strongly connected component value quantifying a number of strongly connected vertices where, for each strongly connected vertex, there is a first path from a first vertex to a second vertex and a second path from the second vertex to the first vertex, the first vertex and the second vertex corresponding to a first user and a second user, respectively, who act as buyers and sellers in transactions between themselves in the social network;

the in-component value quantifying a number of in vertices, each in vertex corresponding to a third user who acts as a seller to the first user;

the out-component value quantifying a number of out vertices, each out vertex corresponding to a fourth user who acts as a buyer from the second user;

the tube value quantifying a number of tube vertices, each tube vertex being between the third user and the fourth user that do not include the first user and the second user;

the tendril value quantifying a number of tendril vertices, each tendril vertex being a buyer from the third user or a seller to the fourth user but have not conducted a transaction with the first user or the second user;

the disconnected component value quantifying a number of vertices that are not quantified by the strongly connected component value, the in-component value, the out-component value, the tendril value, or the tube value;

calculating, by the one or more processors, a social strength of the social network for the time period by applying a weighting factor to each of the strongly connected component value, the in-component value, the out-component value, the disconnected component value, the tendril value, and the tube value and summing the weighted values; and identifying one or more users associated with the strongly connected component, the strongly connected component value being a value of the strongly connected component for the time period;

modifying an aspect of the social network associated with the one or more users;

retrieving the strongly connected component value, the in-component value, the out-component value, the disconnected component value, the tendril value, and the tube value of the social network for an additional time period, the additional time period being after the modifying of the aspect;

calculating, by the one or more processors, the social strength of the social network for the additional time period by combining the strongly connected component value, the in-component value, the out-component value, the disconnected component value, the tendril value, and the tube value; and utilizing the social strength of the social network for the time period and the additional time period for analysis in accordance with the modifying of the aspect of the social network.

11. The method of claim 10, wherein the modifying of the aspect comprises:
providing the one or more users with an incentive to have a plurality of other users utilize a feature of the social network.

12. The method of claim 10, wherein the modifying of the aspect comprises:
providing the one or more users with a designated status in the social network.

13. A non-transitory machine-readable medium comprising instructions, which when implemented by one or more processors perform operations, comprising:
retrieving a strongly connected component value, an in-component value, an out-component value, a disconnected component value, a tendril value, and a tube value of a social network for a time period;

the strongly connected component value quantifying a number of strongly connected vertices where, for each strongly connected vertex, there is a first path from a first vertex to a second vertex and a second path from the second vertex to the first vertex, the first vertex and the second vertex corresponding to a first user and a second user, respectively, who act as buyers and sellers in transactions between themselves in the social network;

the in-component value quantifying a number of in vertices, each in vertex corresponding to a third user who acts as a seller to the first user;

the out-component value quantifying a number of out vertices, each out vertex corresponding to a fourth user who acts as a buyer from the second user;

the tube value quantifying a number of tube vertices, each tube vertex being between the third user and the fourth user that do not include the first user and the second user;

the tendril value quantifying a number of tendril vertices, each tendril vertex being a buyer from the third user or a seller to the fourth user but have not conducted a transaction with the first user or the second user;

the disconnected component value quantifying a number of vertices that are not quantified by the strongly connected component value, the in-component value, the out-component value, the tendril value, or the tube value;

calculating a social strength of the social network for the time period by applying a weighting factor to each of the strongly connected component value, the in-component value, the out-component value, the disconnected component value, the tendril value, and the tube value and summing the weighted values; and utilizing the social strength of the social network for the time period for analysis of the social network, wherein the strongly connected component value has the greatest weight and the disconnected component value has the lowest weight.

14. The non-transitory machine-readable medium of claim 13, wherein the retrieving includes:

determining the strongly connected component value in accordance with a graph percentage of a strongly connected component of the social network;

determining the in-component value in accordance with the graph percentage of an in-component of the social network;

determining the out-component value in accordance with the graph percentage of an out-component of the social network;

determining the disconnected component value in accordance with the graph percentage of a disconnected component of the social network;

determining the tendril value in accordance with the graph percentage of one or more tendrils of the social network; and determining the tube value in accordance with the graph percentage of a tube of the social network.

15. The non-transitory machine-readable medium of claim 13, wherein the utilizing includes:

providing the social strength for a plurality of categories in the social network for the time period for presentation;

wherein the social strength is calculated for the plurality of categories in the social network for the time period.

16. A system comprising:

a value access module, have one or more processors, to retrieve a strongly connected component value, an in-component value, an out-component value, a disconnected component value, a tendril value, and a tube value of a social network for a time period;

the strongly connected component value quantifying a number of strongly connected vertices where, for each strongly connected vertex, there is a first path from a first vertex to a second vertex and a second path from the second vertex to the first vertex, the first vertex and the second vertex corresponding to a first user and a second user, respectively, who act as buyers and sellers in transactions between themselves in the social network;

the in-component value quantifying a number of in vertices, each in vertex corresponding to a third user who acts as a seller to the first user;

the out-component value quantifying a number of out vertices, each out vertex corresponding to a fourth user who acts as a buyer from the second user;

the tube value quantifying a number of tube vertices, each tube vertex being between the third user and the fourth user that do not include the first user and the second user;

the tendril value quantifying a number of tendril vertices, each tendril vertex being a buyer from the third user or a seller to the fourth user but have not conducted a transaction with the first user or the second user;

the disconnected component value quantifying a number of vertices that are not quantified by the strongly connected component value, the in-component value, the out-component value, the tendril value, or the tube value;

a social strength calculation module calculating a social strength of the social network for the time period by weighting each of the strongly connected component value, the in-component value, the out-component value, the disconnected component value, the tendril value, and the tube value accessed by the value access module and summing the weighted values; and a social strength provider module to provide the social strength of the social network for the time period calculated by the social strength calculated module for presentation, wherein the strongly connected component value has the greatest weight and the disconnected component value has the lowest weight.

17. The system of claim 16, further comprising:

a difference provider module to provide a difference between the social strength of the social network for the time period and an additional time period for presentation, wherein the value access module further retrieves the strongly connected component value, the in-component value, the out-component value, the disconnected component value, the tendril value, and the tube value of the social network for the additional time period; and the social strength calculation module further calculates the social strength of the social network for the additional time period by combining the strongly connected component value, the in-component value, the out-component value, the disconnected component value, the tendril value, and the tube value.

18. The system of claim 16, wherein the social network is an online marketplace.

* * * * *

UNITED STATES PATENT AND TRADEMARK OFFICE
CERTIFICATE OF CORRECTION

| | | |
|---|---|---|
| PATENT NO. | : 8,473,422 B2 | Page 1 of 1 |
| APPLICATION NO. | : 12/957327 | |
| DATED | : June 25, 2013 | |
| INVENTOR(S) | : Shen et al. | |

It is certified that error appears in the above-identified patent and that said Letters Patent is hereby corrected as shown below:

In the Claims

In column 19, line 56, in claim 16, delete "have" and insert --having--, therefor Signed and Sealed this
Ninth Day of December, 2014

Michelle K. Lee
*Deputy Director of the United States Patent and Trademark Office*